(12) United States Patent
Sovio et al.

(10) Patent No.: US 8,488,783 B2
(45) Date of Patent: Jul. 16, 2013

(54) METHOD AND APPARATUS FOR APPLYING RECIPIENT CRITERIA IN IDENTITY-BASED ENCRYPTION

(75) Inventors: Sampo Sovio, Riihimäki (FI); Vesa-Veikko Luukkala, Espoo (FI)

(73) Assignee: Nokia, Espoo (FI)

( * ) Notice: Subject to any disclaimer, the term of this patent is extended or adjusted under 35 U.S.C. 154(b) by 581 days.

(21) Appl. No.: 12/708,778

(22) Filed: Feb. 19, 2010

(65) Prior Publication Data
US 2011/0206200 A1 Aug. 25, 2011

(51) Int. Cl.
*H04L 29/06* (2006.01)
(52) U.S. Cl.
USPC .............................. 380/44; 380/30
(58) Field of Classification Search
None
See application file for complete search history.

(56) References Cited

U.S. PATENT DOCUMENTS

| | | | |
|---|---|---|---|
| 6,247,108 B1 | 6/2001 | Long | |
| 7,017,181 B2 | 3/2006 | Spies et al. | |
| 7,103,911 B2 | 9/2006 | Spies et al. | |
| 7,113,594 B2 | 9/2006 | Boneh et al. | |
| 7,337,322 B2 | 2/2008 | Gentry et al. | |
| 7,370,202 B2 | 5/2008 | Appenzeller et al. | |
| 7,571,321 B2 | 8/2009 | Appenzeller et al. | |
| 2002/0051540 A1 | 5/2002 | Glick et al. | |
| 2002/0059201 A1 | 5/2002 | Work | |
| 2004/0165728 A1 | 8/2004 | Crane et al. | |
| 2005/0084100 A1* | 4/2005 | Spies et al. | 380/30 |
| 2007/0104323 A1 | 5/2007 | Hammell et al. | |
| 2007/0242827 A1 | 10/2007 | Prafullchandra et al. | |
| 2008/0049937 A1 | 2/2008 | Pauker et al. | |
| 2008/0082512 A1 | 4/2008 | Hogan et al. | |
| 2009/0046852 A1* | 2/2009 | Vanstone | 380/30 |
| 2009/0055648 A1 | 2/2009 | Kim et al. | |

OTHER PUBLICATIONS

H. Andersen, "An Introduction to Binary Decision Diagrams," Technical University of Denmark, 49285 Advanced Algorithms E97, Oct. 1997, Accessed on Sep. 18, 2012, Online: www.cs.unb.ca/~gdueck/courses/cs4835/bdd97.pdf.*
A. Voronkov, "Binary Decision Diagrams," Chapter 10, Mar. 2009, Accessed on Sep. 18, 2012, Online: www.voronkov.com/lics_doc.cgi?what=chapter&n=10.*
F. Somenzi, "Binary Decision Diagrams," Calculational System design, NATO Science Series F: Computer and Systems Sciences 173, pp. 303-336.*
F. Towhidi, et al. "Binary Decision Diagram (BDD)," Future Computer and Communication, ICFCC 2009, Apr. 3-5, 2009, pp. 496-499.*
Binary decision diagram. Accessed: Apr. 22, 2010, http://en.wikipedia.org/wiki/Binary_decision_diagram, pp. 1-5.
Boneh, D. et al., Identity-Based Encryption from the Weil Pairing, SIAM J. of Computing, vol. 32, No. 3, pp. 586-615, 2003. Accessed: May 17, 2010, http://crypto.stanford.edu/~dabo/papers/ibe.pdf, pp. 1-31.

(Continued)

*Primary Examiner* — Jung Kim
*Assistant Examiner* — Robert Leung
(74) *Attorney, Agent, or Firm* — Ditthavong Mori & Steiner P.C.

(57) ABSTRACT

An approach is provided for reducing communication traffic and cost by applying recipient criteria in identity-based encryption. A recipient criterion application selects one or more recipient criteria for data, and encrypts the data using the selected one or more recipient criteria as a public key of identity-based encryption.

17 Claims, 14 Drawing Sheets

OTHER PUBLICATIONS

The Pairing-Based Crypto Lounge, Accessed: May 18, 2010, http://www.larc.usp.br/~pbarreto/pblounge.html, pp. 1-31.

Office Action for related U.S. Appl. No. 12/730,881 dated Apr. 16, 2012, pp. 1-43.

Office Action for related U.S. Appl. No. 12/730,884 dated Jun. 27, 2012, pp. 1-46.

International Search Report for PCT Application No. PCT/FI2010/051089, dated Apr. 14, 2011, pp. 1-6.

Martin, L. "Identity-based encryption comes of age," IEEE Computer, vol. 41, No. 8, pp. 93-95, Aug. 2008.

Written Opinion of the International Searching Authority for PCT Application No. PCT/FI2010/051089, dated Apr. 14, 2011, pp. 1-6.

Office Action for related U.S. Appl. No. 12/730,881 dated Jan. 18, 2013, pp. 1-28.

* cited by examiner

720

700

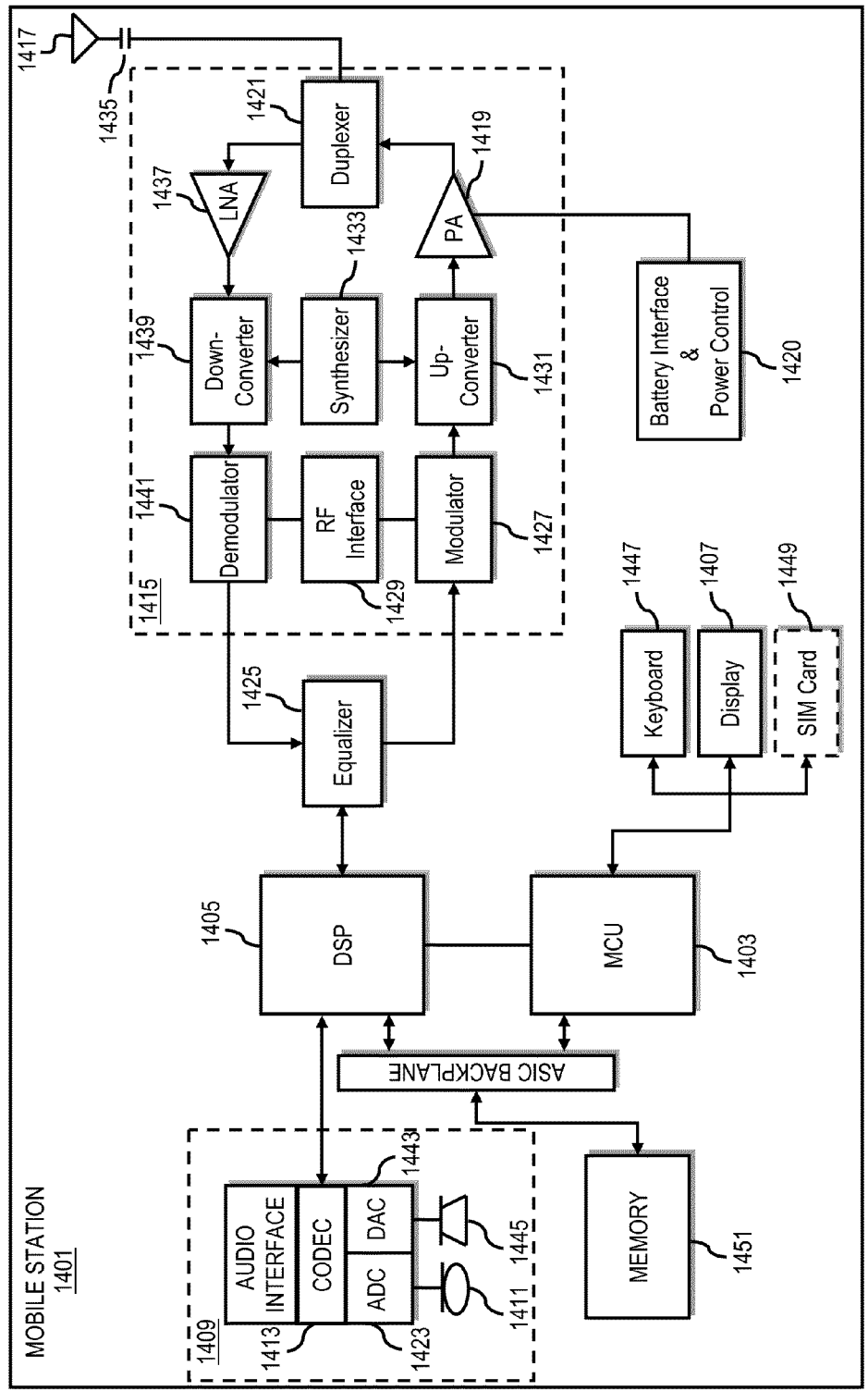

METHOD AND APPARATUS FOR APPLYING RECIPIENT CRITERIA IN IDENTITY-BASED ENCRYPTION

BACKGROUND

Service providers (e.g., wireless, cellular, Internet, content, social network, etc.) and device manufacturers are continually challenged to deliver value and convenience to consumers by, for example, providing compelling network services and advancing the underlying technologies. One area of interest has been in ways to facilitate users to share content on the existing networks while maintaining user privacy and confidentiality using encryption. Public key cryptography is a widely used to protect data so that only a specific person or a machine can access the data. However, encryption techniques rely upon long and randomly generated keys that typically are mapped to identities using digitally-signed certificates. The management of these certificates and the task of fetching a certificate before encryption become daunting, as the numbers of users and keys increase. On the other hand, users (e.g., commercial advertisers, non-profit fund raisers, end users, etc.) are seeking ways to distribute messages to target recipients without knowing the identities of the target recipients. Consequently, service providers and device manufacturers face the challenge of providing sufficient communication and network resources to support anonymous yet targeted encrypted information dissemination.

SOME EXAMPLE EMBODIMENTS

Therefore, there is a need for an approach for applying recipient criteria in identity-based encryption.

According to one embodiment, a method comprises selecting one or more recipient criteria for data. The method also comprises encrypting the data using the selected one or more recipient criteria as a public key of identity-based encryption.

According to another embodiment, an apparatus comprising at least one processor, and at least one memory including computer program code, the at least one memory and the computer program code configured to, with the at least one processor, cause, at least in part, the apparatus to select one or more recipient criteria for data. The apparatus is also caused to encrypt the data using the selected one or more recipient criteria as a public key of identity-based encryption.

According to another embodiment, a computer-readable storage medium carrying one or more sequences of one or more instructions which, when executed by one or more processors, cause, at least in part, an apparatus to select one or more recipient criteria for data. The apparatus is also caused to encrypt the data using the selected one or more recipient criteria as a public key of identity-based encryption.

According to another embodiment, an apparatus comprises means for selecting one or more recipient criteria for data. The apparatus also comprises means for encrypting the data using the selected one or more recipient criteria as a public key of identity-based encryption.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 14 is a diagram of a mobile terminal (e.g., handset) that can be used to implement an embodiment of the invention.

DESCRIPTION OF SOME EMBODIMENTS

Figure 1:
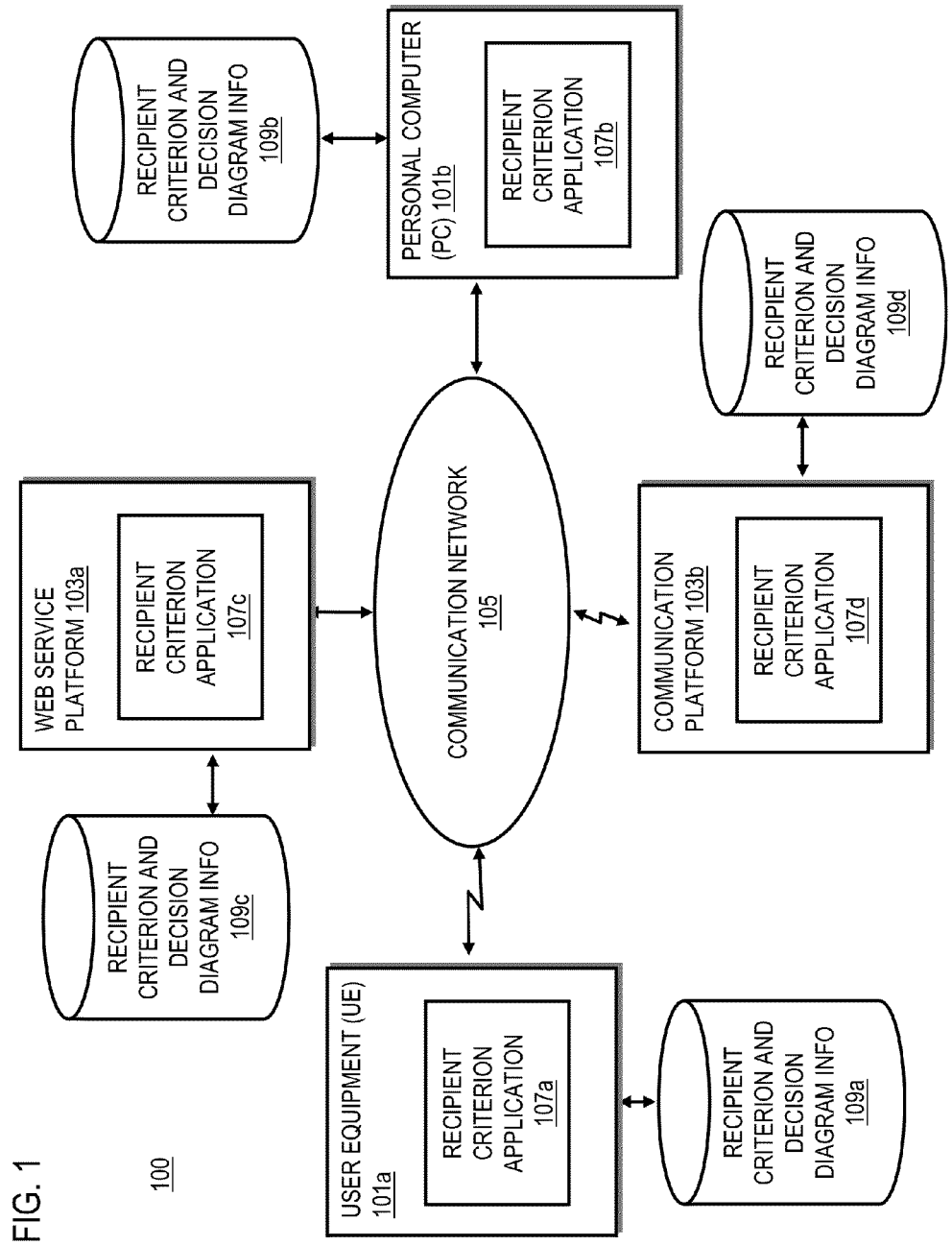
FIG. 1 is a diagram of a system capable of applying recipient criteria in identity-based encryption, according to one embodiment.

A method and apparatus for applying recipient criteria in identity-based encryption are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Identity-based encryption (IBE) is a public-key technology. IBE is different from other public-key technologies in that IBE keys are calculated with unique information about the identity of the user (e.g., a user's email address), instead of being generated randomly. Identity-based systems allow any party to generate a public key from a known identity value such as an ASCII string or information in any data representation. To operate, a trusted third party, called the private key generator (PKG) first publishes a master public key, and retains a corresponding master private key. Given the master public key, any party can compute a public key corresponding to the identity ID by combining the master public key with the identity value. To obtain a corresponding private key, an authorized party contacts the PKG, which uses the master private key to generate the private key for the identity ID. Since public keys are derived from identity IDs, IBE eliminates the need for a public key distribution infrastructure. This further eliminates the need for a sender and a receiver in an IBE-based messaging system to interact with each other, before sending secure messages. The authenticity of the public keys is guaranteed as long as the transport of the private keys to the corresponding user is kept secure. IBE-encrypted messages can use standard message formats, such as the cryptographic message syntax (CMS).

As used herein, the term "decision diagram" refers to a compact graphical and/or mathematical representation of a decision situation, sets, or relations. A decision diagram, for example, may be a binary decision diagram (BDD) or a reduced ordered binary decision diagram (ROBDD). A BDD is "ordered" if different variables appear in the same order on all paths from the root. A BDD is "reduced" if any isomorphic subgraphs of its graph are merged and any nodes whose two child nodes are isomorphic are eliminated. Isomorphic subgraphs of the same decision diagram have similar appearance but originate from different sources. A ROBDD is a group of Boolean variables in a specific order and a directed acyclic graph over the variables. A directed acyclic graph (DAG) contains no cycles. This means that if there is a route from node A to node B then there is no way back. Although the term BDD almost always refers to reduced ordered binary decision diagram (ROBDD), this application refers to ROBDD separately from BDD to avoid confusion.

A decision diagram may be used to organize any data, including one or more recipient criteria, into a tree-type data structure that permits identification of a result by traversing various branches of the structure. Although various embodiments are described with respect to applying recipient criteria, it is contemplated that the approach described herein may be used with other data that can be organized into a tree-type data structure. The term "AugBDD" refers to an augmented ROBDD which is augmented information including the ROBDD and at least one of a header with a hash identifier ("hash ID"), a construction history of the ROBDD, keyed hash IDs, and cardinality information (e.g., relationships between data tables, constraints on the types and number of class instances a property may connect with respect to a given ontology, etc.). Each ROBDD is given a hash ID by operating a hash function over its ROBDD graph structure. Ideally, the hash function would never produce the same hash ID for two different ROBDDs.

As used herein, the term "construction history information" of a hash identifier of interest includes at least one or more other hash identifiers corresponding to a respective one or more other decision diagrams used to construct a decision diagram corresponding to the hash identifier of interest. The construction history also includes identification of one or more Boolean operators applied to the other hash identifiers listed in history. Since the ROBDD may be constructed by BDD operations from other ROBDDs, a succinct representation of the ROBDD including the construction history of the ROBDD and a hash ID can be sent instead of the ROBDD, to reduce data traffic. In one embodiment, plain hash IDs form the basis for the communication. A keyed hash ID may be added in the communication along with a key ID. This allows the recipient to ensure that the keyed hash ID can be created from the corresponding graph (or the plain hash ID) by using the produced key. To create a keyed hash ID, the data of the ROBDD is serialized to be input into a keyed hash function, such as HMAC-SHA1, HMAC-SHA-256, etc. The keyed hash function allows entities to share the same secret key and to independently ensure that the resulting hash IDs were created by an entity having the secret key. Key IDs may correspond to different groups, such as different social networks. A key ID together with an ROBDD graph constitute proof that the ROBDD has been constructed by the owner of the key ID.

FIG. 1 is a diagram of a system capable of applying recipient criteria in identity-based encryption, according to one embodiment. As discussed above, the need to distribute messages to target recipients without knowing their identities is growing. If applying recipient criteria in a traditional public key system, a sender will create a temporary symmetric encryption key to encrypt secret data, publish encrypted data, and then send the encryption key together with the applied recipient criteria to a trusted 3rd party in network. The trusted third party can use the applied recipient criteria to screen for authorized parties, before delivering a decryption key to the authorized parties. As the amount of encrypted data increase, the trusted third party has to maintain an enormous database that contains one pair of a decryption key and corresponding recipient criteria for each set of secret data. The size of such a database grows bigger than the database of a traditional public key system that does not implement any recipient criteria.

The system 100 of FIG. 1 addresses this problem with a solution of applying recipient criteria (C) (e.g., user personality feature such as age, gender, personal interest, etc.; technical capability of receiving device such as digital rights management compliance; device usage patterns; environmental conditions in which the device is used; context information associated with the device such as location, time, day; other predetermined conditions; or a combination thereof) as an encryption key on the secret data (D) in identity-based encryption. In this case, the trusted third party only needs to keep a database about half of the size as the above-discussed database. Since the encryption key is the recipient criteria, the database only needs to keep the recipient criteria and then calculate a decryption key based upon the recipient criteria when necessary.

In one embodiment, all participants of the system 100 obtain an IBE master public key (MK) and domain parameters (DP) from a private key generator (PKG). This occurs once, for example at the time of manufacturing the UE 101a, 101b that are later used by the participants, and does not need to occur again. The system 100 uses IBE master public key (MK), domain parameters (DP), and the recipient criteria (C) to encrypt the secret data (D) through an IBE description function: $E\_D=ibe\_encrypt(MK,DP,C)$, and publishes the encrypted data (E D), for example, at an information store.

By way of example, any party who meets the recipient criteria can choose a criteria (C'), contact the PKG with C' to obtain a decryption key, and then use the description key to decrypt the published encrypted secret data (D) into decrypted data (D') through an IBE decryption function: $D'=ibe\_decrypt(E\_D,DK,DP)$. The decryption key can be used to decrypt any information that has been encrypted using the same criteria as an encryption key. The party either has some foreknowledge of the C' or opportunistically offers the C' to the PKG to see if the party can decrypt the published encrypted secret data.

In another embodiment, the information store stores the published encrypted secret data E_D in association with the criteria C, such as by tagging E_D with C, thereby controlling different kinds of access to C. For example, the information store maintains the association between E_D and C, while making C invisible to the party.

After verifying that the party meets the recipient criteria, the PKG sends the party a decryption key for decrypting the encrypted secret data. However, as the use of encryption keys for maintaining user privacy grows, the size of the database can increase significantly. The system 100 of FIG. 1 improves the solution by representing the recipient criteria in an information representation format or structure (e.g., a RDF graph), using the RDF graph as a public key to encrypt the secret data, and publishing the encrypted data. The PKG then verifies authorized parties as discussed above (e.g., verifies that the authorized parties meet the recipient criteria). To simplify the discussion, RDF graphs are used as one example of representation of the recipient criteria. In one embodiment, RDF graphs represent decision diagrams and describe resources with classes, properties, and values. A node/resource is any object which can be pointed to by a uniform resource identifier (URI), properties are attributes of the node, and values can be either atomic values for the attribute, or other nodes. RDF Schema provides a framework to describe application-specific classes and properties. Classes in RDF Schema are like classes in object oriented programming languages. This allows resources to be defined as instances of classes, and subclasses of classes.

The RDF graphs are represented or encoded in decision diagrams which describe the properties and relations of different classes. A class has a name and potentially several associated properties, and it may be a subclass of another class. Possible properties are represented as arcs from one class node to other class nodes. These property-arcs can be properties of the object which have values (that are the nodes targeted by the property arcs).

Each RDF-graph includes a set of unique triples in a form of subject, predicate, and object, which allow expressing graphs. For example, in this piece of information "Dave Stewart is a musician," the subject may be Dave Stewart, the predicate may be is, and the object may be musician. The simplest RDF-graph is a single triple. Any node or entity can store unconnected graphs. As later explained in more detail, the approach described herein can be adapted in a smart space that includes the semantic web and has distributed nodes and entities that communicate RDF-graphs (e.g., via a blackboard or a shared memory).

To further reduce the size of the recipient criterion representation, the system 100 uses, for instance, a subset of the RDF graph to represent the recipient criteria. By way of example, a compact representation of the RDF graph in the form of a reduced ordered binary decision diagram (ROBDD) is used as a subset of the RDF graph. In another embodiment, instead of the ROBDD, an augmented ROBDD ("AugBDD") including a hash identifier is employed to further reduce the size of recipient criterion representation. As the size of the recipient criterion representation is further reduced, the storage required for the recipient criterion representation is also reduced. More specifically, the system 100 provides for hash tables listing known or existing RDF graphs along with their corresponding respective ROBDDs, hash identifiers and other related information. A user may then consult one of the hash tables to obtain a corresponding decision diagram with a hash identifier.

One consideration for selecting the RDF graph encoding scheme is that the encoding scheme should generate a hash identifier for a decision diagram with a reasonably small size while maintaining uniqueness of the hash identifier such that any two decision diagrams will not have identical hash identifiers. For example, upon receiving a search query, the system 100 serializes the decision diagram into variables and then feeds the variables into a hash function thereby obtaining unique hash identifiers corresponding to the decision diagram. In addition, the system 100 can truncate the hash identifiers to a specific bit size while maintaining their uniqueness, thereby saving communication resources (e.g., reducing network bandwidth) while transmitting the same information.

In other words, to address the problem of the traditional public encryption systems, a system 100 of FIG. 1 introduces the capability to apply recipient criteria in identity-based encryption. The RDF graphs of recipient criteria are encoded to decision diagrams to be communicated between the nodes (e.g., the UE 101) and entities (e.g., the platforms 103, etc.). To further reduce communication traffic, the system 100 encodes (e.g., hashes) the decision diagrams of the recipient criteria into hash IDs, and avoids sending decision diagrams of the recipient criteria by sending the hash IDs (and optionally a construction history of the decision diagrams). The reduced ordered binary decision diagram (ROBDD) is used as an efficient representation for a binary decision diagram representing the recipient criteria and hashed with a hash function into a hash identifier (hash ID).

As shown in FIG. 1, the system 100 comprises a user equipment (UE) 101a having connectivity to a personal computer 101b, a web service platform 103a and a communication platform 103b via a communication network 105. Each of the UE 101a, the personal computer 101b, the web service platform 103a and the communication platform 103b has a recipient criterion application 107 and a database 109 for storing hash identifier and decision diagram information. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101a, the personal computer 101b, the web service platform 103a and the communication platform 103b communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
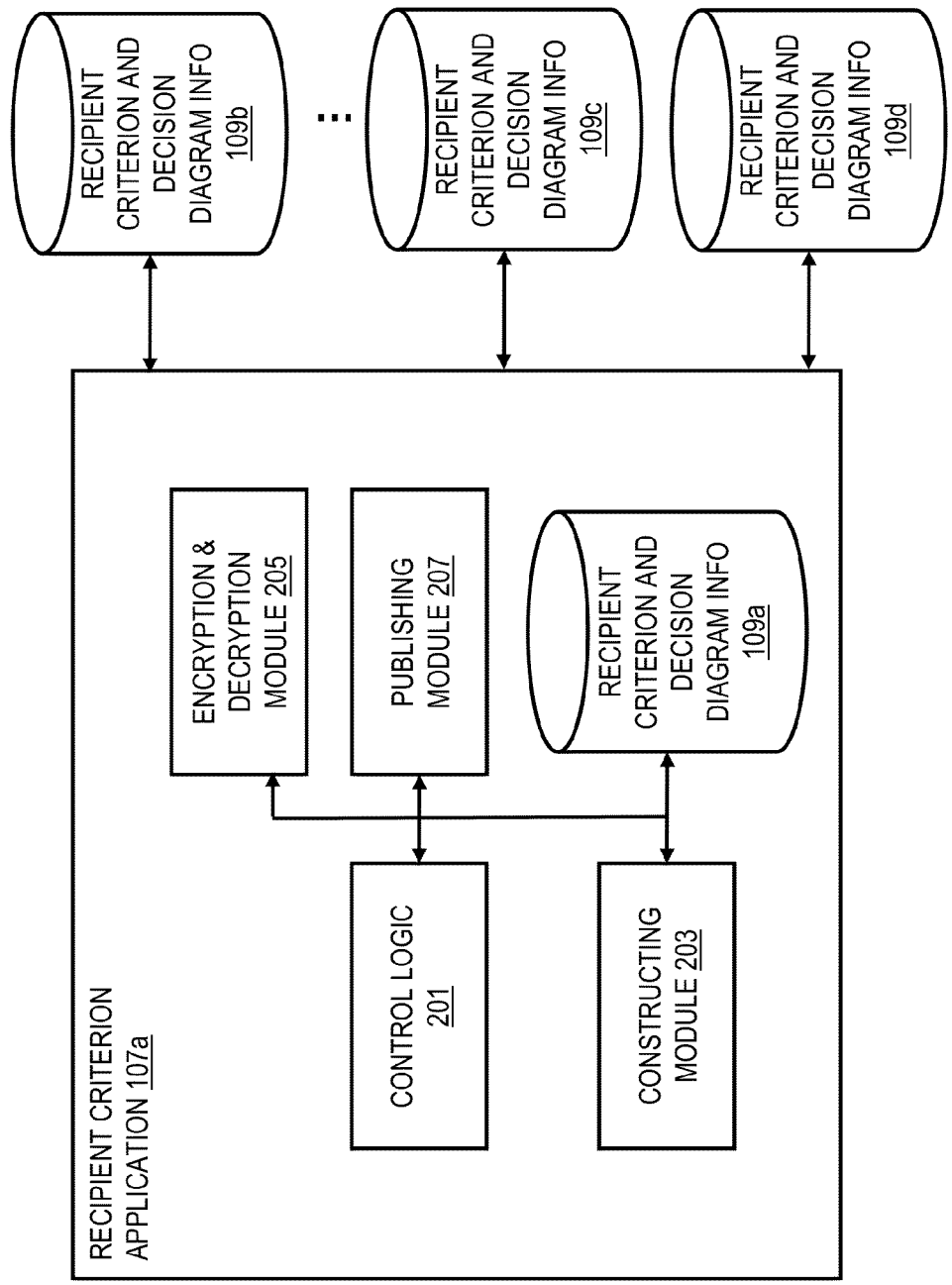
FIG. 2 is a diagram of the components of a recipient criterion application, according to one embodiment.

FIG. 2 is a diagram of the components of the recipient criterion application 107a, according to one embodiment. By way of example, the recipient criterion application 107a includes one or more components for applying recipient criteria in identity-based encryption. In certain embodiments, the recipient criterion application 107a may be a widget. By way of example, widgets are light-weight applications based on standard web technologies (e.g., web runtime (WRT)—a web application runtime environment included in many browsers) that serve as frontends or clients to web-based or other content and functions. Widgets provide a convenient means for presenting information and accessing services. It is contemplated that the functions of these components may be combined in one or more components or performed by other components of equivalent functionality.

In this embodiment, the recipient criterion application 107a includes a control logic 201 for controlling the operation of the recipient criterion application 107a, and a constructing module 203 for constructing a RDF graph from one or more recipient criteria, a ROBDD from the RDF graph, a hash identifier of the ROBDD, and a keyed hash identifier of the ROBDD. The constructing module 203 also constructs a RDF graph from secret data, a ROBDD from the RDF graph, a hash identifier of the ROBDD, and a keyed hash identifier of the ROBDD. The recipient criterion application 107a also includes an encryption/decryption module 205 for encrypting the secret data using one of the ROBDD, hash identifier, or keyed hash identifier of the recipient criteria as a public key, and decrypting the encrypted secret data with a decryption key. The recipient criterion application 107a further includes a publishing module 207 for publishing the encrypted secret data. The recipient criterion applications 107b, 107c, 107d have the same or similar features of the recipient criterion application 107a.

Figure 3:
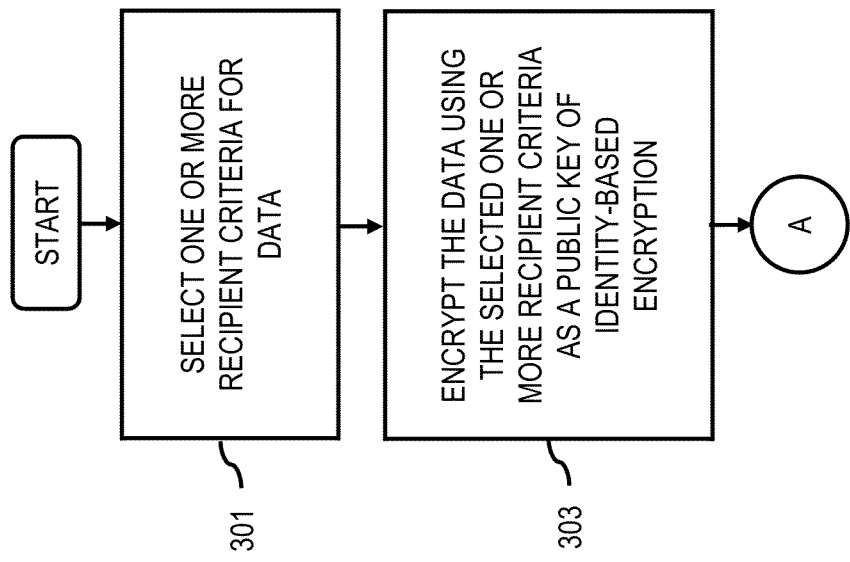
FIG. 3 is a flowchart of a process for applying recipient criteria in identity-based encryption, according to one embodiment.
Figure 13:
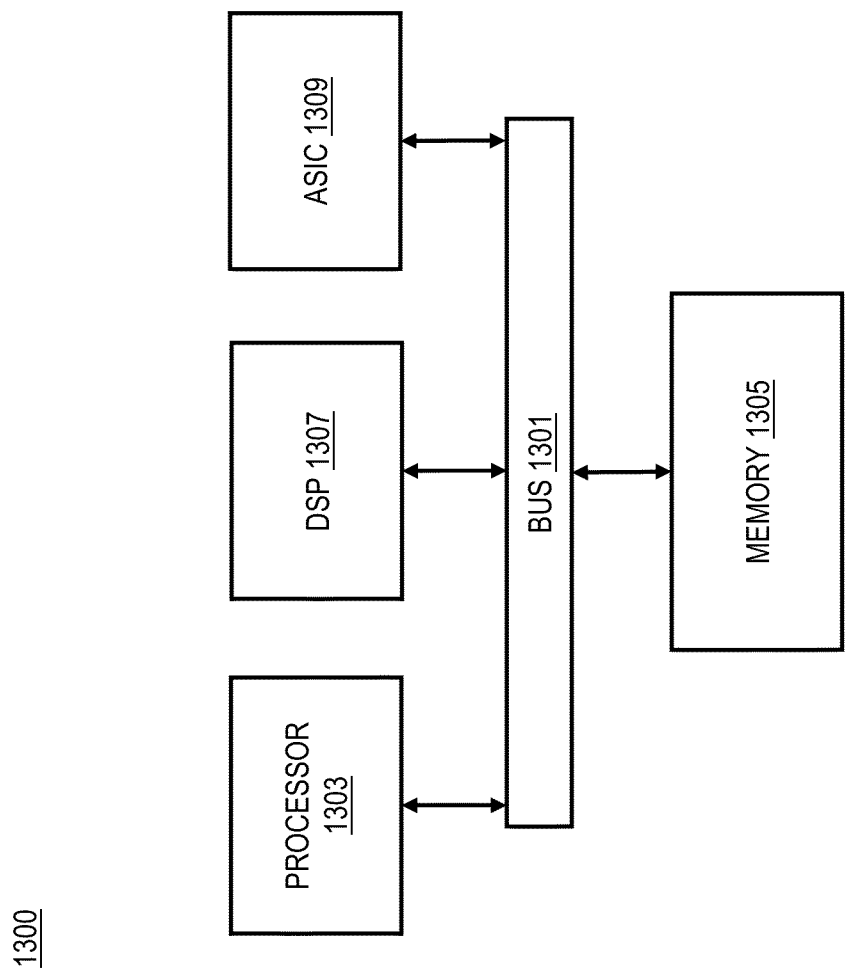
FIG. 13 is a diagram of a chip set that can be used to implement an embodiment of the invention.

FIG. 3 is a flowchart of a process for applying recipient criteria in identity-based encryption, according to one embodiment. In one embodiment, the recipient criterion application 107a performs the process 300 and is implemented in, for instance, a chip set including a processor and a memory as shown in FIG. 13. In step 301, the recipient criterion application 107a selects one or more recipient criteria for sending secret data. By way of example, in social networking and applications, a user may want to share with people some data, applications and devices that meet some arbitrary criteria. These recipient criteria may include: (1) personality features such as age, gender, personal interest, etc.; (2) receiving device must fulfill some technical requirements, such as Blu-ray, digital right management (DRM) compliant, etc.; (3) Recipient as a frequent user of certain applications, media content items, certain type of media content, etc.; (4) any user defined conditions; (5) any enforced conditions, e.g., enforced by a server, device, player, etc.; (6) any sensed physical values including a temperature, location, etc. of a device or of the environment the device is situated; or (7) any logical combinations of above conditions.

In many circumstances, a user may want to share information with just people of like mind and/or same hobbies (e.g., people meeting certain recipient criteria). In other words, the user may only want to reach out people meeting these criteria without knowing their actual identification. In this scenario, the recipient criterion application 107a can encrypt the information to be shared (e.g., the secret data) using the recipient criteria itself (e.g., an age range and music preferences) as a public key of identity-based encryption (step 303). An example process used in the approach of system 100 is described in more detail with respect to FIG. 4 below.

Figure 4:
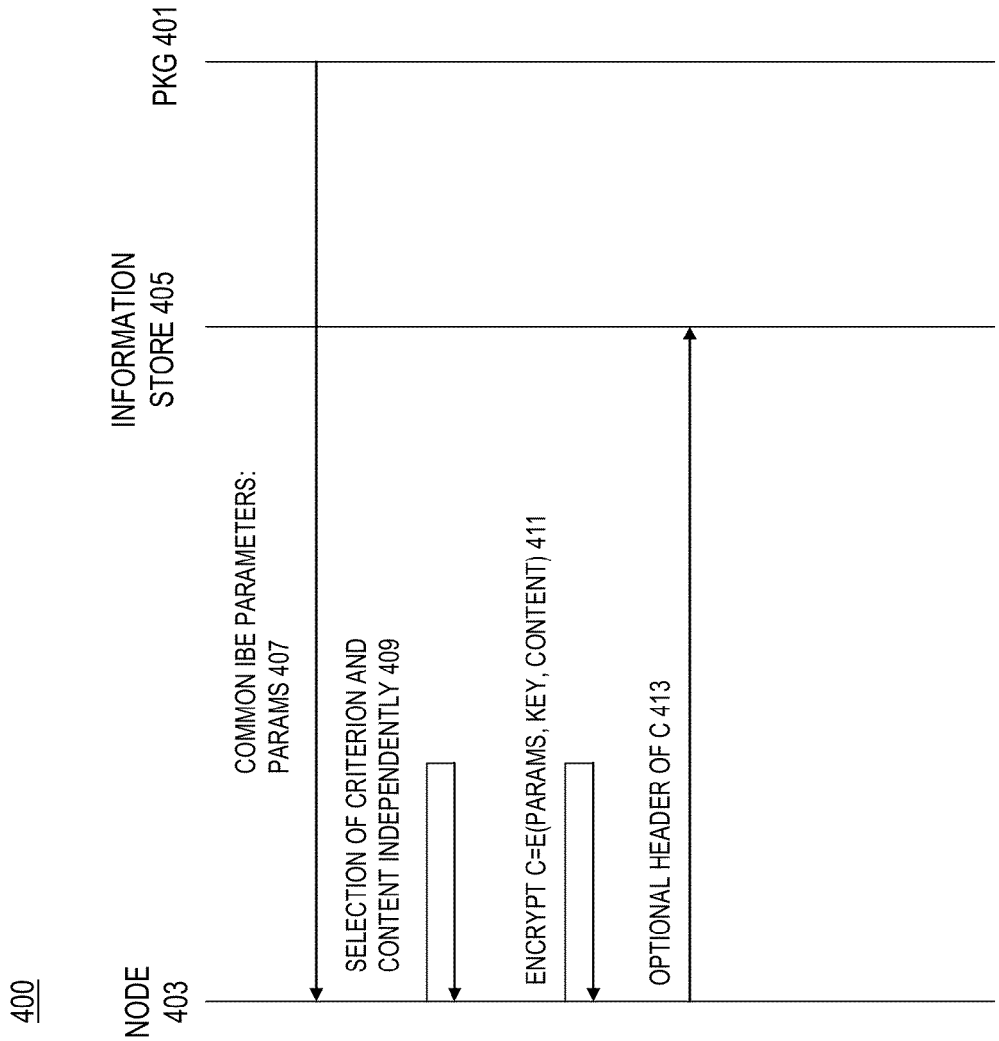
FIG. 4 is an operational diagram for content encryption, according to one embodiment.

FIG. 4 is an operational diagram for content encryption, according to one embodiment. The operation starts from a PKG 401 that sends common IBE parameters ("params") to a node 403 in a process 407. This operation is typically done once, for instance, at a factory during manufacturing of the node 403. By way of example, the node 403 can be a user (e.g., the UE 101) or an entity (e.g., the platform 103). The node 403 independently selects one or more recipient criteria and secret data (i.e., the user's favorite song of Dave Stewart) in a process 409. The node 403 then encrypts the secret data using the recipient criteria (e.g., females fans of Dave Stewart age between 18-24) as a public key using a formula, e.g., C=E (params, key, content) in a process 411, where C is the encrypted secret data and E is an encryption function.

In a process 413, the node 403 has an option to send to an information store 405 a message including the recipient criteria together with a header. For example, the message can be an email, SMS, EMS, MMS, etc.; and the header can describe or otherwise specify the recipient criteria. When the recipient criteria are sent in a message without a header, the information store 405 or any intended recipient can read the recipient criteria transmitted through a logically separate message. The separate message makes the recipient criteria visible, i.e., not being encrypted. On the other hand, if the recipient criteria are not described in the header or transmitted through the separate message, the intended recipient, that meets the specified criteria and/or has a corresponding decryption key given by the information store 405, cannot determine whether to decrypt the published encrypted secret data C before trying to decrypt C.

When the message is sent with a header containing the recipient criteria, the information store 405 can take action based upon the header without reading the message body. Further, if the information store 405 makes the header available for everyone, the intended recipient can determine whether to decrypt C before trying to decrypt C. It is noted that under some conditions, although non-intended recipients (e.g., as other nodes) may have no key to open up or decrypt the published encrypted secret data, the non-intended recipients may nonetheless use the recipient criteria described in the header to generate other encrypted secret data (e.g., spam, etc.) targeted at the group of intended recipients. When the node 403 is concerned about such spam attacks or other unwanted information resulting from the recipient criteria described in the header, the node 403 can still include the header in the message while requesting that information store 405 not to publish the recipient criteria.

Information on IBE standard parameters is available in "Network Working Group RFC5091: Identity-Based Cryptography Standard (IBCS) #1: Supersingular Curve Implementations of the BF and BB1 Cryptosystems" by Boyen et al., December 2007, which is hereby incorporated in its entirety by reference. By way of example, the following system parameters are set to be compatible with Type-1 Curve implementation (see section 4.4.2 of RFC5091) under the Boneh-Franklin scheme which is an IBE scheme (2001) well known in the art. It is noted that this system 100 can be adapted to optimal and efficient IBE schemes other than the Boneh-Franklin scheme. In one embodiment, a setup algorithm is run by the PKG 401 one time for creating the whole IBE environment and specifying the IBE scheme to be used. In one scheme, a master private key is kept secret and used to derive users' private keys. The system parameters are made public. In one embodiment, communicating parties (e.g., the PKG 401, the node 403, the information store 405, the recipients, etc.) share common system/domain parameters consisting of:

1. A curve equation, e.g., $y^2=x^3+1$ (mod p). Notation ^ means exponentiation, for example $3^2=9$. This curve is super singular elliptic curve defined over prime field modulus p.

2. A prime number p, such that p-11 is divisible by 12. Table 1 shows an example of a 160-bit prime number p.

TABLE 1

160-bit p: 4628236012732956947166466380278328774854899817356162950397778022553559602757168 2403523039302607064059086264337188754104627452209193485052688971519224473787

3. A prime number q, which is factor of p+1. Table 1 shows an example of an 80-bit prime number q.

TABLE 2

80-bit q: 730750862221594424981965739670091261094297337857

4. A cryptographic hash function, for example SHA-1 or SHA-256.

5. A generator point G=(gx,gy). Table 3 shows examples of gx, and gy of a generator point G.

TABLE 3

Gx: 1362212693006244976261717406498032714049990840032545186686781810978826879176302266287075124629896137662494689902501355374053953193727252031547546029452082.
Gy: 3417155546207505847562196395047169467224752030249995531264773737680773390350362553320557587705902160597001941246354373290175857715776978873306105826757970

6. A domain specific common public key Pub, that is a point (x,y) of the curve $y^2=x^3+1$, Pub=s*G, where s is master key. For example, the Pub can be computed from a master secret S. Since s is not part of domain parameters, revealing Pub does not reveal the s. Table 4 shows examples of a master secret S, pubx and puby of a common public key point Pub on the curve.

TABLE 4 s: 225583316487780073365887458939250518527897200743.
Pubx: 1573382930774501489984389017815676752610414521925654803077364914828090745472601196651043132655428878163891955620121763413918063069501285236543725950022426
Puby: 335185893155630604029525466600826927342836796563167082320662668132521276241139900350944840249086405981332879131657417348551192261111013961696323134907739

It is described on page 57 of RFC5091 that the security levels of the system 100 can be achieved with certain parameter sizes. RSA (which stands for Rivest, Shamir and Adleman who first publicly described it) is an algorithm for public-key cryptography, and is widely used in electronic commerce protocols. Typically, 1024-bit RSA corresponds to 80-bit of security. This security level can be achieved with a 512-bit p and a 160-bit q. 2048-bit RSA is recommended nowadays, and it corresponds to 112-bit security. This security level can be achieved with a 1024-bit p and a 224-bit q.

Figure 5:
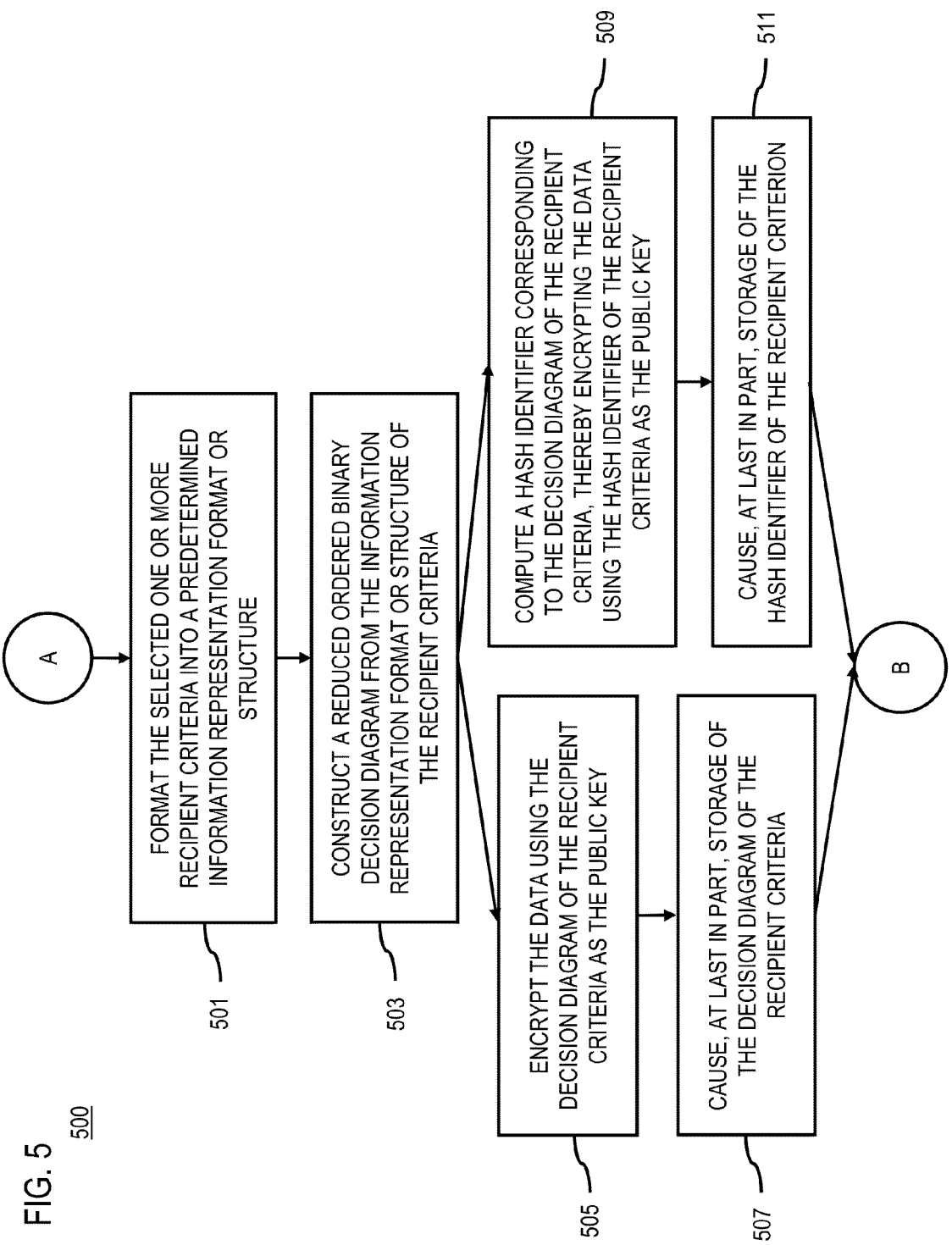
FIG. 5 is a flowchart of a process for applying recipient criteria in identity-based encryption, according to one embodiment.

FIG. 5 is a flowchart of a process for applying recipient criteria in identity-based encryption, according to one embodiment. The process of FIG. 5 is discussed with respect to FIG. 6 and FIGS. 7A and 7B which depict example RDF graphs that can be used in the IBE encryption process. In one embodiment, the recipient criterion application 107a performs the process 500 and is implemented in, for instance, a chip set including a processor and a memory as shown in FIG. 13. In step 501, the recipient criterion application 107a formats the selected recipient criteria into a predetermined information representation format or structure (e.g., a RDF graph).

Figure 6:
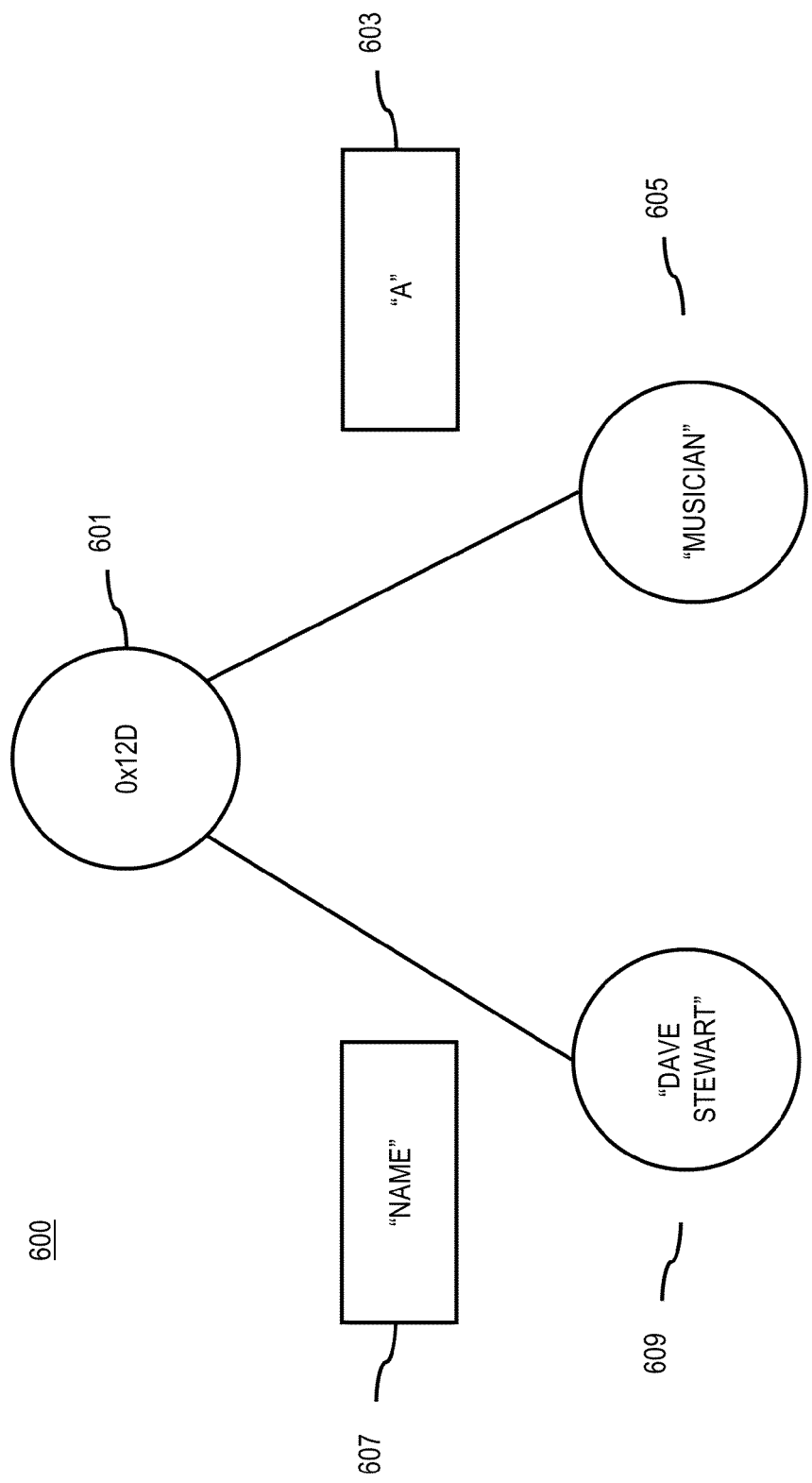
FIG. 6 depicts an instance of a simple RDF graph, according to one embodiment.

FIG. 6 depicts an instance of a simple RDF graph, according to one embodiment. In this example, a RDF graph 600 representing one of the recipient criteria, i.e., "Dave Stewart is a musician," which is represented by the following two triples in Table 5:

TABLE 5

0x12D, a, Musician
0x12D, name, "Dave Stewart"

Figure 7B:
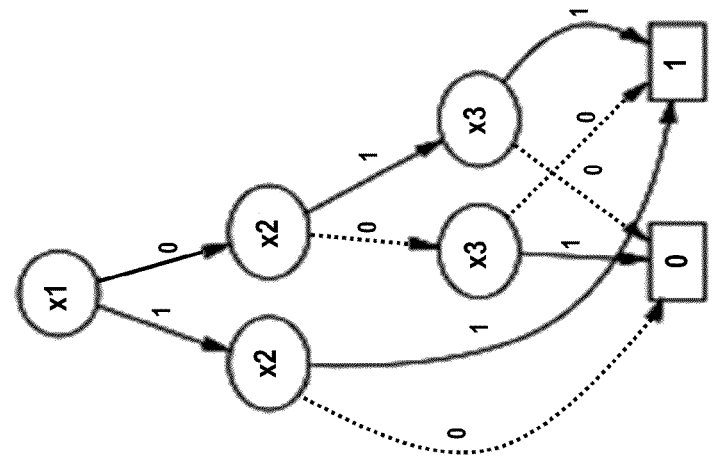
FIGS. 7A-7B are diagrams of a binary decision diagram and a corresponding reduced ordered binary decision diagram, according to one embodiment.
Figure 7A:
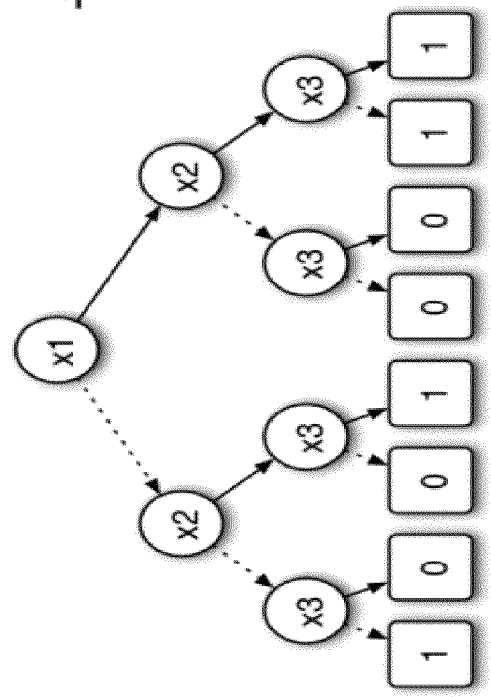

The RDF graph includes an instance 601, "0.times.12 D," is "a" (e.g., an RDF process 603) "Musician" (e.g., an RDF node 605) and has a "name" (e.g., an RDF process 607) of "Dave Stewart" (e.g., an RDF node 609)." To simplify the discussion, there are only two vertices extending from instance 601 "0.times.12 D" and there is no subtree below the RDF node 605 "Musician" or the RDF node 609 "Dave Stewart." However, it is contemplated that there can be any number of vertices and/or subtrees below any of the RDF nodes (e.g., nodes 605 or 609) of the RDF graph 600, to represent the information of age between 18-24, and fans of Dave Stewart, etc., as part of recipient criterion RDF. FIG. 7A is a diagram of a more complicated RDF graph, according to one embodiment. FIG. 7B is a diagram of a reduced ordered binary decision diagram corresponding to the RDF graph of FIG. 7A, according to one embodiment.

Returning to process 500 of FIG. 5, the recipient criterion application 107a constructs the ROBDD 720 of FIG. 7B from the RDF graph 700 of FIG. 7A representing the recipient criteria (Step 503). In particular, the recipient criterion application 107a serializes the RDF graph 700 into variables of a predetermined format to construct the ROBDD 720. There are many ways or conditions for encoding the RDF graph 700 into bit vectors. For instance, the bit size can be three as discussed below. Different bit sizes result in, for instance, different numbers of variables which lead to ROBDD graphs of different sizes and shapes. ROBDD is essentially a group of Boolean variables in a specific order and a directed acyclic graph over the variables. In the example of FIG. 6, the recipient criterion application 107a sets five BDD variables representing the subject (e.g., the instance 601 "0×12 D"), the predicates (e.g., process 603 "a" and process 607 ", name") and the objects (e.g., node 605 "Musician" and node 609, "Dave Stewart"). The recipient criterion application 107a then selects a number of bits for representing and encoding the subject, the predicates, and the objects. Accordingly, the recipient criterion application 107a encodes these variables in three bits and saves the encoding information in a dictionary as follows in Table 6:

TABLE 6

| 0x12D | <=> 101 |
|---|---|
| a | <=> 001 |
| Musician | <=> 011 |
| name | <=> 010 |
| Dave Stewart | <=> 100 |

The recipient criterion application 107a constructs a ROBDD 720 from the variables. With respect to the example of FIG. 6, the recipient criterion application 107a uses the encoded variables to create a ROBDD graph consisting of nine one-bit variables, where the first three variables are interpreted as a variable encoding the first field of the triple, the second three variables are interpreted as a variable encoding the second field, and the last three variables are interpreted as a variable encoding the third field of the triple. This ROBDD 720 is unique for the chosen triples and variable ordering, resulting in representation of the following encoded triples in Table 7:

TABLE 7

101 001 011
101 010 100

Thereafter, in one embodiment, the recipient criterion application 107a encrypts the secret data using the ROBDD 720 of the recipient criteria as the public key as shown in Step 505 of FIG. 5. The recipient criterion application 107a then causes, at last in part, storage the ROBDD of the recipient criteria (Step 507). Since the ROBDD 720 is smaller than the RDF graph 700, this embodiment provides a means for reducing the storage and network traffic for sending recipient criteria related information.

In another embodiment, the recipient criterion application 107a computes a hash identifier corresponding to the ROBDD 720 of the recipient criteria, thereby encrypting the secret data using the hash identifier of the recipient criteria as the public key (Step 509). The recipient criterion application 107a then causes, at last in part, storage of the hash identifier of the recipient criteria (Step 511). Since the hash identifier is shorter than the ROBDD 720, this embodiment provides a means for further reducing the storage and network traffic for sending recipient criteria related information.

To compute the hash identifier of the ROBDD 702, the recipient criterion application 107a selects a hash function for obtaining unique hash identifiers within the system 100, and feeds the representation into the hash function. Like the size of the bit encoding, the hash function is usually chosen heuristically or to be adhered to by all users and/or components of the system 100. Optionally, the recipient criterion application 107a shortens the computed hash identifier by truncating a result of the hash function while obtaining unique hash identifiers. The recipient criterion application 107a then stores the hash identifier with the ROBDD 720, before publishing the hash identifier of the recipient criteria.

Figure 8:
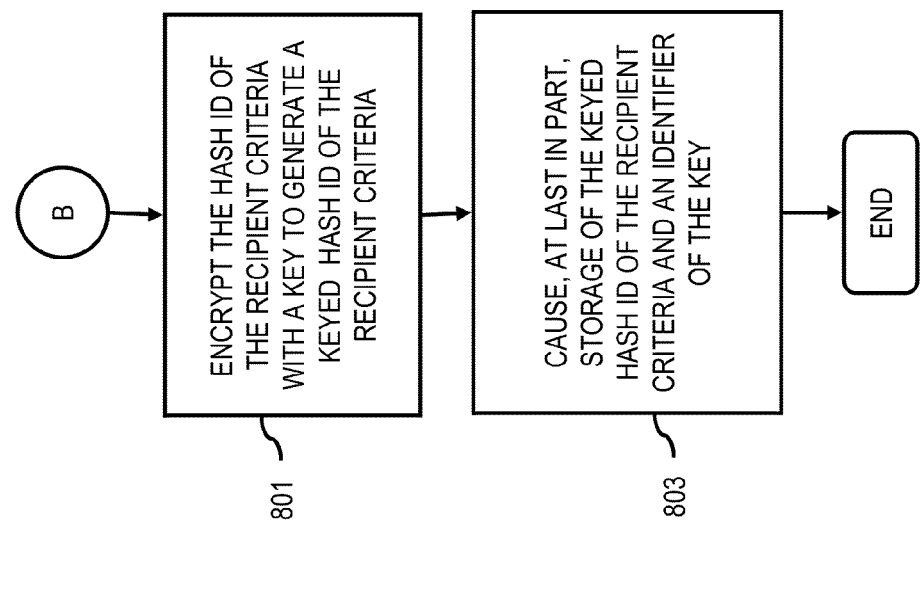
FIG. 8 is a flowchart of a process for applying an encrypted hash identifier ("hash ID") of recipient criteria, according to one embodiment.

FIG. 8 is a flowchart of a process for applying an encrypted hash identifier of recipient criteria, according to one embodiment. In one embodiment, the recipient criterion application 107a performs the process 800 and is implemented in, for instance, a chip set including a processor and a memory as shown in FIG. 13. In step 801, the recipient criterion application 107a encrypts the hash identifier of the recipient criteria with a key to generate a keyed hash identifier of the recipient criteria. The recipient criterion application 107a causes, at last in part, storage of the keyed hash identifier of the recipient criteria and an identifier of the key (Step 803). Since the keyed hash identifier is more secured than the hash identifier, this embodiment provides a means for further securing the recipient criteria related information.

As discussed, there are different advantages of sending to the information store 405 the message including the recipient criteria with or without a header describing the recipient criteria. In another embodiment, by using a header that contains some derivative of the recipient criteria, such as the hash identifier or the keyed hash identifier of the recipient criteria, the problem of spam attacks are prevented while the information of the recipient criteria is made available for the information store 405 and/or intended recipients. To obtain the ROBDD 720 or the RDF 700 from the hash identifier or the keyed hash identifier, the information store 405 and/or the intended recipients may compare incoming derivative of the potential recipient criteria with the derivatives in a database to identify the corresponding ROBDD 720 or RDF 700. Alternatively, the information store 405. Alternatively, the intended recipients may reconstruct the ROBDD 720 or RDF 700 via a reverse computation as discussed above in conjunction with the construction history of the ROBDD 720 or RDF 700 in the database. When the derivative of the recipient criteria is a keyed hash identifier, the key used to encrypt the hash identifier is identified by the key ID, and then used to decrypt the keyed hash identifier.

Figure 9:
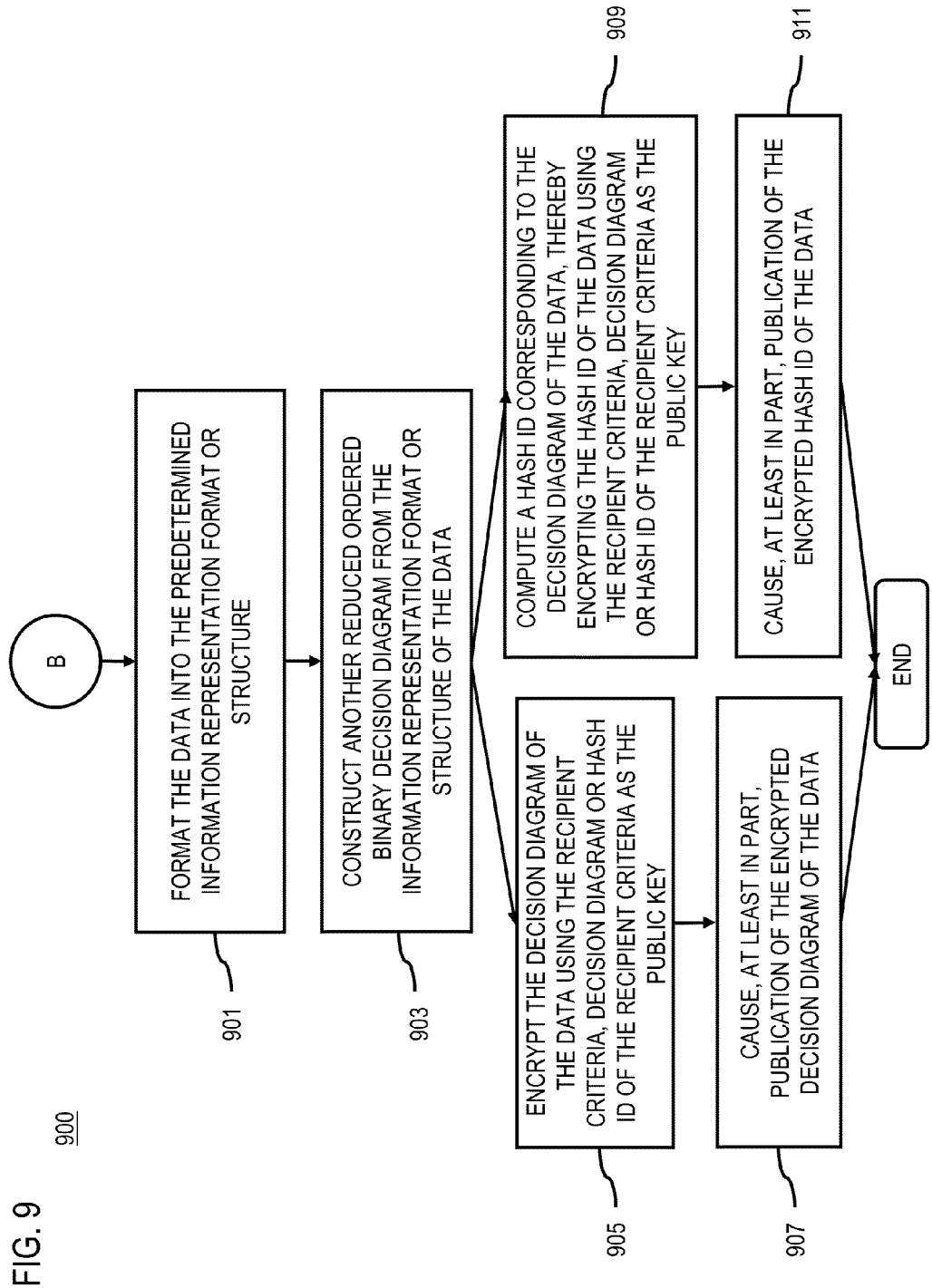
FIG. 9 is a flowchart of a process for handling secret data in identity-based encryption, according to one embodiment.

FIG. 9 is a flowchart of a process for handling secret data in identity-based encryption, according to one embodiment. In one embodiment, the recipient criterion application 107a performs the process 900 and is implemented in, for instance, a chip set including a processor and a memory as shown in FIG. 13. In step 901, the recipient criterion application 107a formats the secret data (i.e., the user's favorite song by Dave Stewart) into an RDF graph as described for the recipient criteria in Step 501 of the FIG. 5. The recipient criterion application 107a constructs another ROBDD from the RDF of the secret data (Step 903), again as described with respect to the RDF 700 of the recipient criteria in Step 503 of FIG. 5.

In one embodiment, the recipient criterion application 107a encrypts the ROBDD of the secret data using either the recipient criteria, the RDF of the recipient criteria, or the ROBDD 720 of the recipient criteria as the public key (Step 905). The recipient criterion application 107a causes, at least in part, publication of the encrypted ROBDD of the secret data via the information store 405 or any databases in the semantic web (Step 907).

In another embodiment, the recipient criterion application 107a computes a hash identifier corresponding to the ROBDD of the secret data, thereby encrypting the hash identifier of the secret data using either the recipient criteria, the RDF of the recipient criteria, or the hash identifier of the recipient criteria as the public key (Step 909). The recipient criterion application 107a then causes, at least in part, publication of the encrypted hash identifier of the secret data (Step 911).

Optionally, the encrypted hash identifier of the secret data can be further encrypted with a key following a process similar to FIG. 8 for creating a keyed hash identifier of the secret data, to provide one additional layer of protection. The encrypted ROBDD, hash identifier, or keyed hash identifier of the secret data can be published in the semantic web with the hash identifier or keyed hash identifier of the recipient criteria that is used to encrypt the encrypted decision diagram, hash identifier, or keyed hash identifier of the secret data. The above-discussed sets of keys, key IDs, and the encrypted targets can be stored at the PKG 401, node 403, the information store 405 for marching the corroding ROBDDs or RDF graphs without transmitting them over the communication network. In addition, if these entities also store the construction histories of the ROBDDs or RDF graphs, they can reconstruct a ROBDD or RDF graph locally based on a hash identifier or a keyed hash identifier, when the ROBDD or RDF graph is not stored locally.

Figure 10:
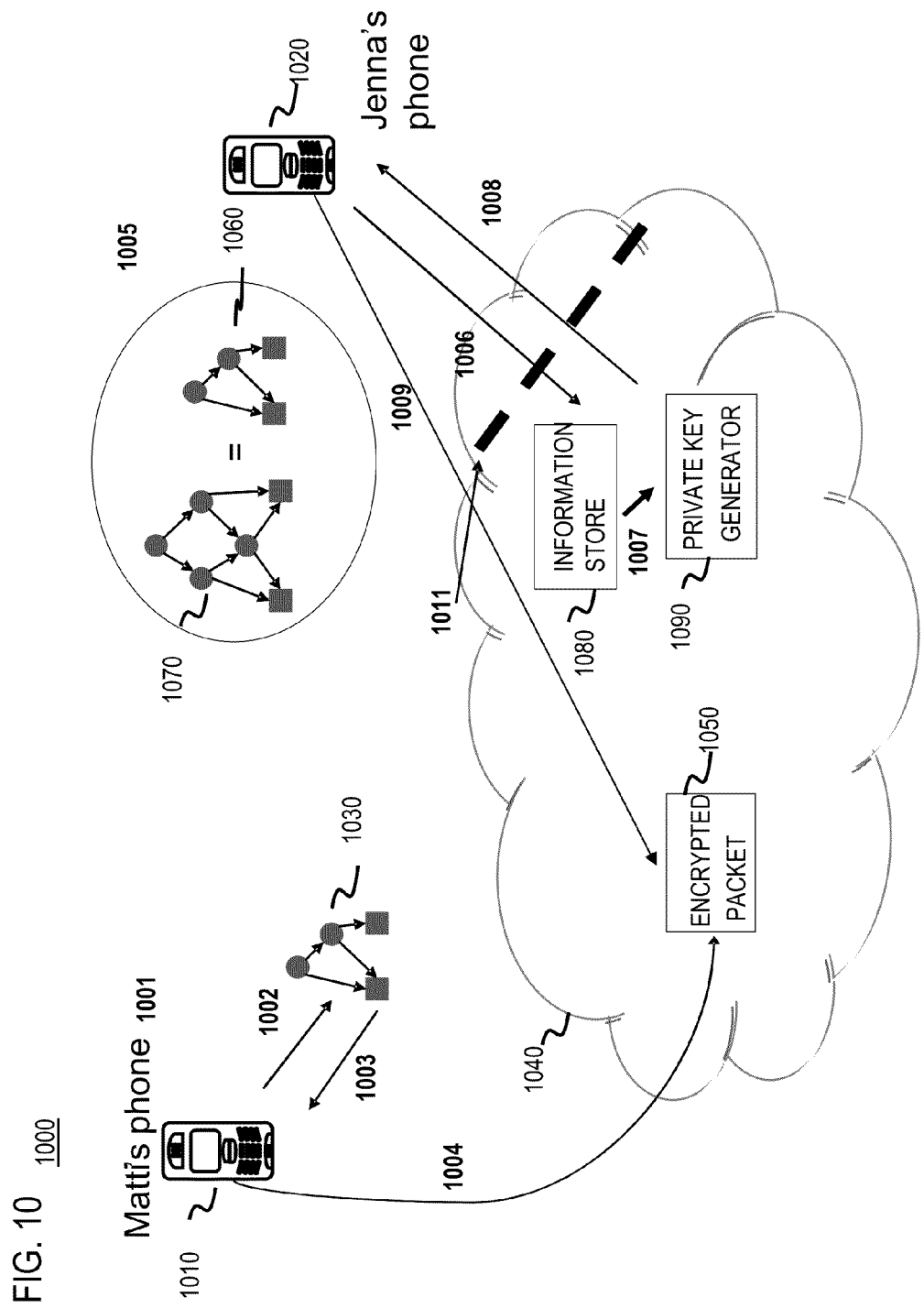
FIG. 10 is utilization diagram of the process of FIG. 3, according to one embodiment.

FIG. 10 is utilization diagram of the process of FIG. 3, according to one embodiment. Considering a situation shown in FIG. 10, one user (e.g., Matti) wants to shares secret data with participants (e.g., Jenna) in a social network meeting one or more criteria via their mobile terminals 1010, 1020. By way of example, the users may participate in the data or information sharing via personal computers or other kinds of devices or equipment as described with respect to the UE 101 above. In operation 1001, Matti sets recipient criteria for his secret data, for example, as women of 18-24 years old, downloaded songs of Dave Stewart, and optionally certified by a service provider as a basic level or an extreme level. By way of example, Matti expresses the recipient criteria, i.e., a privacy policy to select the participants of the group to which he targets the secret, as follows in Table 8:

TABLE 8

```
:c
    :download "Dave Stewart"
    :age "18-24"
    :sex "female"
    :sp_certified "Basic|Extreme"      # optional
```

The recipient criterion application 107a within Matti's phone 1010 constructs a RDF graph containing the recipient criteria, and converts the RDF graph into a ROBDD 1030 during an operation 1002. The recipient criterion application 107a also computes a hash identifier for the ROBDD 1030 via AugBDD_id C_ID=AugBDD(:c) during an operation 1003. Matti sets his secret data to include, for example, a Dave Stewart fan club account number and fan club postal office mail box for fans to denote money to buy two albums "Sweet Dreams" and "One of the boys" or to directly denote the two albums. The secret data optionally contains the fan club account name and password assigned by a service provider. By way of example, Matti sets the secret data, which Matti wants to share with people who can demonstrate to fulfill the recipient criteria, as follows in Table 9:

TABLE 9

```
:s
    :fan_club_bank_account "10000"
    :fan_club_pobox "10615"
    :fan_bulletin_board "Donate Dave Stewart albums to disabled kids"
    :album_name "Sweet Dreams"
    :album_name "One of the boys"
    :sp_account_name "davefan1"        # optional
    :sp_account_passwd "davedave"      # optional
```

The recipient criterion application 107a then converts the secret data into a ROBDD, generates a hash identifier via S_ID=AugBDD(:s). A set of IBE common domain parameters (e.g., common_pars) as discussed is obtained from a centralized source. The recipient criterion application 107a encrypts the secret data using the hash identifier as a public key via Msg=IBE_crypt(common_pars, C_ID,S_ID). The recipient criterion application 107a publishes in the cloud 1040 the hash identifier and a packet/message 1050 containing the encrypted secret data in a format of E_hash_id(data) during an operation 1004. The term "cloud" is used as a metaphor for the Internet, based on the cloud drawing used to depict the Internet in computer network diagrams as an abstraction of the underlying infrastructure it represents to provide services of processing power, storage, software or other computing services. Typically these services are rented by a service provider.

Instead of the cloud 1040, the recipient criterion application 107*a* inserts the hash identifier of the recipient criteria and the packet into a smart space (discussed later) as common data via Insert (:Matti, :SP_IBE_content,(msg,C_ID)).

When Jenna, an 18 years old female indicates via her phone 1020 that she wants to download one or more songs of Dave Stewart from an information store in the cloud 1040, the recipient criterion application 107*a* within Jenna's phone 1020 updates Jenna's old ROBDD 1060 into a ROBDD 1070 with information of the downloaded songs and coverts the new ROBDD 1070 into a hash identifier during an operation 1005. The recipient criterion application 107*a* then sends the hash identifier to the cloud 1040 during an operation 1006.

An information store 1080 in the cloud 1040 matches Jenna's new ROBDD 1070 with the ROBDD 1030 corresponding to the Matti's hash identifier of the recipient criteria, and then notifies a PKG 1090 during an operation 1007. The PKG 1090 then finds the private/decryption key corresponding to Matti's hash identifier of the recipient criteria, and sends the decryption key to Jenna during an operation 1008.

The recipient criterion application 107*a* within Jenna's phone 1020 then can use the decryption key to decrypt the packet/message 1050 containing the encrypted secret data during an operation 1009.

Before decrypting the packet, Jenna's recipient criterion application 107*a* checks the header of the packet for the recipient criteria to determine if it is something that might interest her. For example, the determination can be made automatically based upon Jenna's preference data stored in the phone 1020, or made by displaying the recipient criteria to Jenna to prompt her to indicate her interest. If the header contains a hash identifier of the recipient criteria, the recipient criterion application 107*a* searches locally for a matched ROBDD then determine based upon the ROBDD. The social network has friendship relations and public information of its participants. These relations and information are formed into RDF graphs, which can be constructed as AugBDDs and published at a central location or any information store in the cloud 1040. The AugBDDs may contain history information of its construction. An ROBDD encoding dictionary/database may be available for all participants. If necessary, the dictionary is transmitted along with the ROBDDs or the AugBDDs.

If there is no matched ROBDD stored locally, the recipient criterion application 107*a* can reconstruct the ROBDD based upon the construction history of the ROBDD, or ask for the ROBDD from the information store 1080. If the header contains a keyed hash identifier of the recipient criteria, the recipient criterion application 107*a* finds the key used to encrypt the hash identifier of the recipient criteria either locally or from the information store 1080, decrypts the keyed hash identifier with the key, and then proceeds to find the corresponding ROBDD of the recipient criteria as discussed.

Optionally, the cloud 1040 enforces configuration validity check between a node (e.g., Jenna's phone 1020) and the PKG 1090 during an operation 1011. For example, the cloud 1040 checks the hash identifier of Jenna's ROBDD and the privacy key to ensure that their configurations are within acceptable or predetermined ranges.

The above described embodiments advantageously enhance outreaching and marketing efforts by providing an anonymous yet tailored messaging mechanism, thereby reducing network resources (e.g., computing resources, bandwidth, etc.) that would otherwise be required to individually identify potential recipients of the marketing efforts. The-above described embodiments also can be used by non-profit as well as for-profit entities to distribute any access-restricted information without knowing or specifying the identification of the recipients. By way of example, a natural disaster may potentially create orphans. A non-profit organization can then use the system 100 to send out messaging worldwide that is specifically targeted to solicit only those prospective adoptive parents that are forty-five or younger, married for at least two years and have no more than two previous marriages per spouse, without children or with children older than five, etc.

As another example, companies, that set goals to use, make, and sell "green products/services" in all aspects of their business operations, can use green recipient criteria to solicit for purchasing green products/services in order to manufacture green products or provide green services. By setting up the green recipient criteria, such as energy efficiency, reduced environmental impact, or ecological preservation, the companies can pre-screen suppliers/service providers (e.g., building maintenance contractors, business consultants, financial advisors, doctors, lawyers, tutors, etc.), customers (e.g., top 50 dental product manufacturers in China, tenants, etc.), employees, etc. with the required qualification and experience.

By encrypting the recipient criteria, the sender of the message keeps the confidentiality of the recipient criteria. By way of example, a pharmaceutical company wants to test the efficacy of Omalizumab, an approved drug for treating asthma, in patients with idiopathic anaphylaxis (recurrent hypersensitive allergic episodes for which a cause is not identified). The pharmaceutical company encrypts the eligibility criteria for medicine trial volunteers, so that their competitors have no access to such commercially valuable information. The eligibility criteria may include: age between 18 and 60 years, having been diagnosed with idiopathic anaphylaxis episodes (mild to severe) at least six times per year, at least once within the last 2 months, and emergency room visit, etc. The pharmaceutical company can also encrypt the recruiting criteria for clinical trial investigators and keep the clinical trial confidential since an earlier stage.

In another example, a marketing company encrypting the recipient criteria to look for participants of a focus group for a target such as an existing or new product, service, concept, advertisement, idea, packaging, price, etc., in order to find out the participants' perceptions, opinions, beliefs and attitudes towards the target. The above-described embodiments provide a means to keep the target and recipient criteria information confidential.

Besides commercial studies, the above-described embodiments can be used for non-profit studies, such as social sciences and urban planning, to allow interviewers to study by interviewing and observing behaviors of people in a group or one-on-one setting (online, teleconferencing, in person, etc.), and discover unexpected issues for exploration. The above-described embodiments provide means for the message sender to conduct outreach to specific recipients without knowing their identities, which not only saves the sender's resources, time and money to research/assemble/purchase a tailored mailing list, but also encourages the public to participate in projects since the participants can remain anonymous.

The conventional participant recruiting scheme requires the sender to publicly post the recruiting criteria on media such as newspaper, sender's own website, job websites, professional association websites, clinical trial matching website, etc. For example, the US patent office sends out a general recruiting letter to all registered patent attorneys and agents to invite them to apply for a job as a patent examiner. If applying the above-described embodiments, the patent office can reach out to any target recipients with specified or predetermined education, technical training, industrial experience in special technology (that is a much big group than the group of registered patent practitioners) and indicating specific job descriptions (e.g., a US citizen or national, PhD in pharmacology, etc.) in each message that a particular recipient is actually qualified for. Such a customized marketing mechanism significantly reduces the number of messages, thus reducing the network traffic and extending equipment lifetime. Such a customized marketing means also spares non-qualified recipients from receiving messages they cannot act upon.

The system 100 can be used in an information cloud, a semantic web, or a smart space architecture to be available in all locations to all nodes and entities. The goal of the semantic web is to define the meaning (semantics) of information and services on the web to be understandable and satisfying the web content searches by people and machines. As information on the Web grows, search engines routinely return thousands of results when, very often, only a handful truly qualify as meaningful for the query presented. The smart space truly achieves the goals of the semantic web and supports interpretability across different service provider, software and hardware platforms, user equipment, databases, etc.

As used herein, a smart space is interoperable over different information domains, different service platforms, and different devices and equipment. For example, the smart space accommodates transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. The smart space also covers technologies used for discovering and using services, such as Bluetooth/human interface device (HID) services, web services, services certified by the Digital Living Network Alliance (DLNA), the Network on Terminal Architecture (NoTA). In addition, the smart space constitutes an infrastructure that enables scalable producer-consumer transactions for information, and supports multiparts, multidevices and multivendors (M3), via a common representation of a set of concepts within a domain and the relationships between those concepts, i.e. ontologies. The smart space as a logical architecture has no dependencies on any network architecture but it can be implemented on top of practically any connectivity solution. Since there is no specific service level architecture, the smart space has no limitation in physical distance or transport.

The smart space allows cross domain searches and provides a uniform, use case independent service application programming interface (API) for sharing information. As an example, the smart space allows a mobile platform to access contextual information in, e.g., a car, home, office, football stadium, etc., in a uniform way and to improve the user experience, without compromising real-time requirements of the embedded system. The smart space uses an ontology governance process as the alternative to using case-specific service API standardization. The ontology governance process agrees and adopts new vocabularies using Resource Description framework (RDF) and RDFS (RDF schema). When RDFS is not sufficient for defining and instantiating the ontologies, web ontology language (OWL) or the like is used.

In one embodiment, the RDF is used to join data from vocabularies of different domains (such as business domains), without having to negotiate structural differences between the vocabularies. In addition, the RDF allows the smart space to merge the information of the embedded domains with the information in web, as well as to make the vast reasoning and ontology theory, practice and tools developed by the semantic web community available for developing smart space applications. The smart space is an aggregation of individual smart spaces of private, group or public entities and the smart space makes the heterogeneous information in embedded domains available for semantic web tools. The smart space architecture expands the concept of a deductive closure towards a distributed deductive closure. The smart space architecture addresses values in application development by abolishing the need for a prior use case standardization such as those in the Digital Living Network Alliance (DLNA) domain and the Bluetooth domain. Furthermore, the smart space architecture abolishes design time freezing of the address of any used service API, such as in the case of WebServices.

The smart space architecture is different from university-driven RDF-store based approaches in getting information of embedded systems as an integral part of the search extent. The space-based approach of the smart space architecture also provides an alternative to surrendering personal data to a search engine or a service provider. The smart space architecture applies to the semantic web an end-to-end design principle which is widely applied in the Internet, since communication media can never know the needs of endpoints as well as the endpoints themselves.

Figure 11:
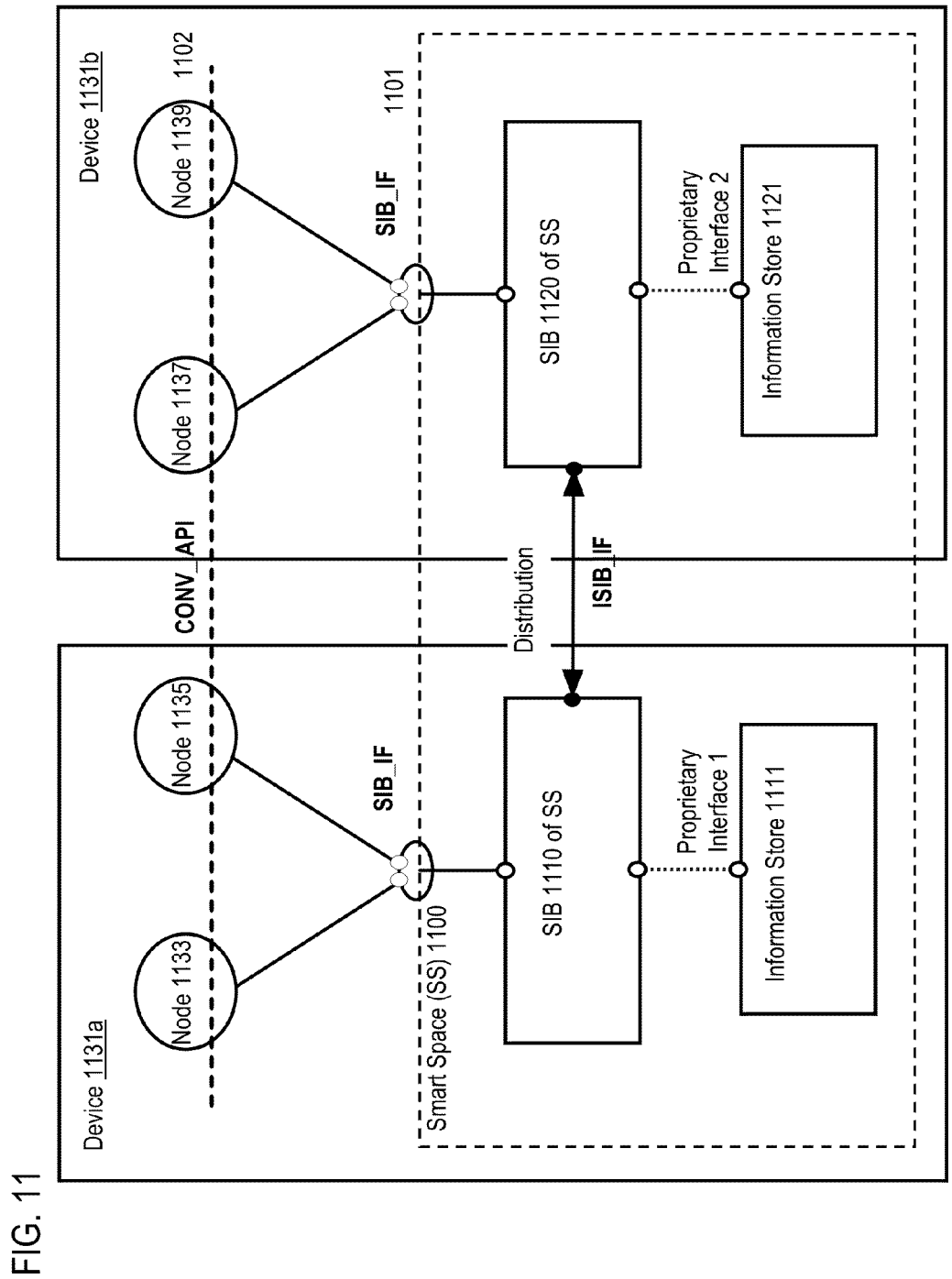
FIG. 11 is a diagram of a smart space structure for utilizing in the process of FIG. 3; according to one embodiment.

FIG. 11 is a diagram of a smart space structure for utilizing in the process of FIG. 3, according to one embodiment. Each smart space 1100 includes smart space nodes/objects 1133, 1135, 1137 and 1139 and semantic information brokers (SIB) 1110, 1120 which form the nucleus of the smart space 1100. Each SIB is an entity performing triple governance in possible co-operation with other SIBs for one smart space. A SIB may be a concrete or virtual entity. Each SIB also supports the smart space nodes/objects 1133, 1135, 1137 and 1139 (e.g., a user, a mobile terminal, or a PC) interacting with other SIBs through information transaction operations required by the system 100, such as accessing various information records for data mining thereby out-reaching the targeted recipients. Any participants of the system 100 can also post their background information at any node or information stores to make the information available for the system 100 to match with different sets of recipient criteria.

From the perspective of the recipients, they do not have to sign-up with any commercial, professional, or social network website in order to receive the above-described messages. Any information the recipients ever provide to a public and/or private entity in the real world or in the virtual world can be incorporated into the smart space as granted by the recipients/participants. The entity can be a real world legal entity or a virtual entity (e.g., an avatar). For example, the information records include the government records (e.g., birth certificates, school records, driver's licenses, tax records, real property records, criminal records, etc.), commercial activity records (e.g., flight tickets, movie tickets, CD/DVD/book purchases, restaurant/store/hospital/gym visits, car/house/education loans, credit debts, phone/utility/heating bills, internet browsing behaviors, etc.), personal activity records (e.g., basketball teams, hikes, etc.). The system 100 data-mines the information records to uncover patterns of the recipients in data either with or without their real-world identification. When the system 100 is allowed by the recipients only to data-mine without associating the information with their real-world identification, the system 100 can associate the data mining results with a reference that may be tied to an alias of the recipient such that the system 100 can send messages to the recipient later. The above-described embodiments reach the recipients over a secure, encrypted mechanism to ensure total confidentiality. The system 100 protect the privacy and confidentiality of the recipients by eliminate the sender's need to know the recipient identification (e.g., names, email addresses, etc.). The system 100 uses the information regarding the messages and the corresponding recipients with authorization of the senders and the recipients.

The devices 1131a, 1131b may be any devices (e.g., a mobile terminal, a personal computer, etc.) or equipment (e.g., a server, a router, etc.). By way of example, RDF is used in the smart space 1100. The triple governance transactions in the smart space 1100 uses a smart space Access Protocol (SSAP) to, e.g., join, leave, insert, remove, update, query, subscribe, unsubscribe information (e.g., in a unit of a triple). A subscription is a special query that is used to trigger reactions to persistent queries for information. Persistent queries are particular cases of plain queries.

The physical distribution protocol of a smart space (i.e., SSAP) allows formation of a smart space using multiple SIBs. With transactional operations, a node/object produces/inserts and consumes/queries information in the smart space 1100. As distributed SIBs belong to the same smart space 1100, query and subscription operations cover the whole information extent of a smart space.

FIG. 11 also shows an implementation structure of the system 100 in the smart space (SS) 1100, the smart space 1100 is depicted in the box in a broken line 1101 (as the boundary of the smart space). There are two devices 1131a, 1131b connected to the smart space. In the upper part of FIG. 11, a dotted line 1102 shows the boundaries of the devices. The devices can be mobile terminals, personal computers, servers, or the like. Each device has nodes (e.g., two) therein. Each node represents a knowledge processor (KP). KPs are entities contributing to inserting and removing contents as well as querying and subscribing content according to ontology relevant to its defined functionality. A KP needs one or more partner KPs for sharing content and for implementing an agreed semantics for the used ontology. With this implementation structure, the smart space 1100 serves private and public entities in different domains A, B using the devices 1131a, 1131b and KPs running in the domains A, in order to support the private and public entities to access information services and the system 100.

In this embodiment, the internal and external AugBDD tables are embedded in the SSAP protocol at SIB_IF or ISIB_IF upon an "insert" protocol message. The system 100 builds itself on top of the smart space protocol, to uses ontological constructs for processing RDF graphs, ROBDDs, hash identifiers for the recipient criteria and the secret data. The SIB_IF is an interface between the SIBs and a device, and the ISIB_IF is an interface between two SIBs.

In one embodiment, the approach described herein is implemented at the interfaces SIB_IF and ISIB_IF of the system 100 to transmit the hash IDs and the encrypted secret data packets. In other embodiments, one or more application programming interfaces (APIs) (e.g., third party APIs) can be used in addition to or instead of SIB_IF and ISIB_IF. The approach described herein provides performance gains while allowing multiple proprietary implementations of information stores in the smart space 1100 according to FIG. 11. The decoding complexity for developing an application is buried below a convenience API (CONV_API) according to FIG. 11. Similarly, the tools for a local (at the node level) information search are provided as a part of a convenience library.

As discussed, the augmentation of construction history and other information related to the ROBDD of the recipient criteria and secret data are embedded in the corresponding AugBDDs. In one embodiment, the smart space protocol messages are checked for hash ID consistency by (1) checking for the correct (according to ontology) types of hash IDs in term of a range and a domain of the instances that have a defined property between them, and (2) checking for a correct number of hash IDs connected by the defined properties. In other words, the (1) and (2) mechanisms are applied to detect the smart space_robdd_id concept within the smart space messages and then perform the checking for the availability of hash IDs from the external index table. The request for a missing hash ID can then be executed via a smart space query. This query relies upon the ROBDD graphs being available in a SIB in the smart space. The AugBDDs can be sent over to a remote system that uses the AugBDDs locally to check the consistency of the hash IDs or other properties in local information stores, which allows checking for ontology conformance without direct access to the ontology description.

One of the problems of sharing information in the semantic web is to share the graphs or parts of the graphs (i.e., subgraphs) among distributed nodes and entities via information stores with sufficient identification of the graphs (especially the subgraphs) while minimizing communication traffic. Private smart space allows each entity to set the shared portions of the smart space with different entities.

As described, the above-described embodiments independently encrypts without collaboration, input, or creating any direct relationships to the intended recipients. Instead, the encryption is based on criteria defining who the recipients might be without specifically identifying the recipients. In addition, the above-described embodiments do not require maintenance of database including pairs of a decryption key a recipient criterion.

The above-described embodiments operating in the smart space allow novel marketing approaches. Taking targeted marketing as an example, after outreaching the anonymous recipients, the system 100 can use pre-existing social networks of the anonymous recipients to produce increases in brand awareness or to achieve other marketing objectives (such as product sales). This kind of promotions may take the form of video clips, interactive games, ebooks, brandable software, images, or even text messages.

The processes described herein for applying recipient criteria in identity-based encryption may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
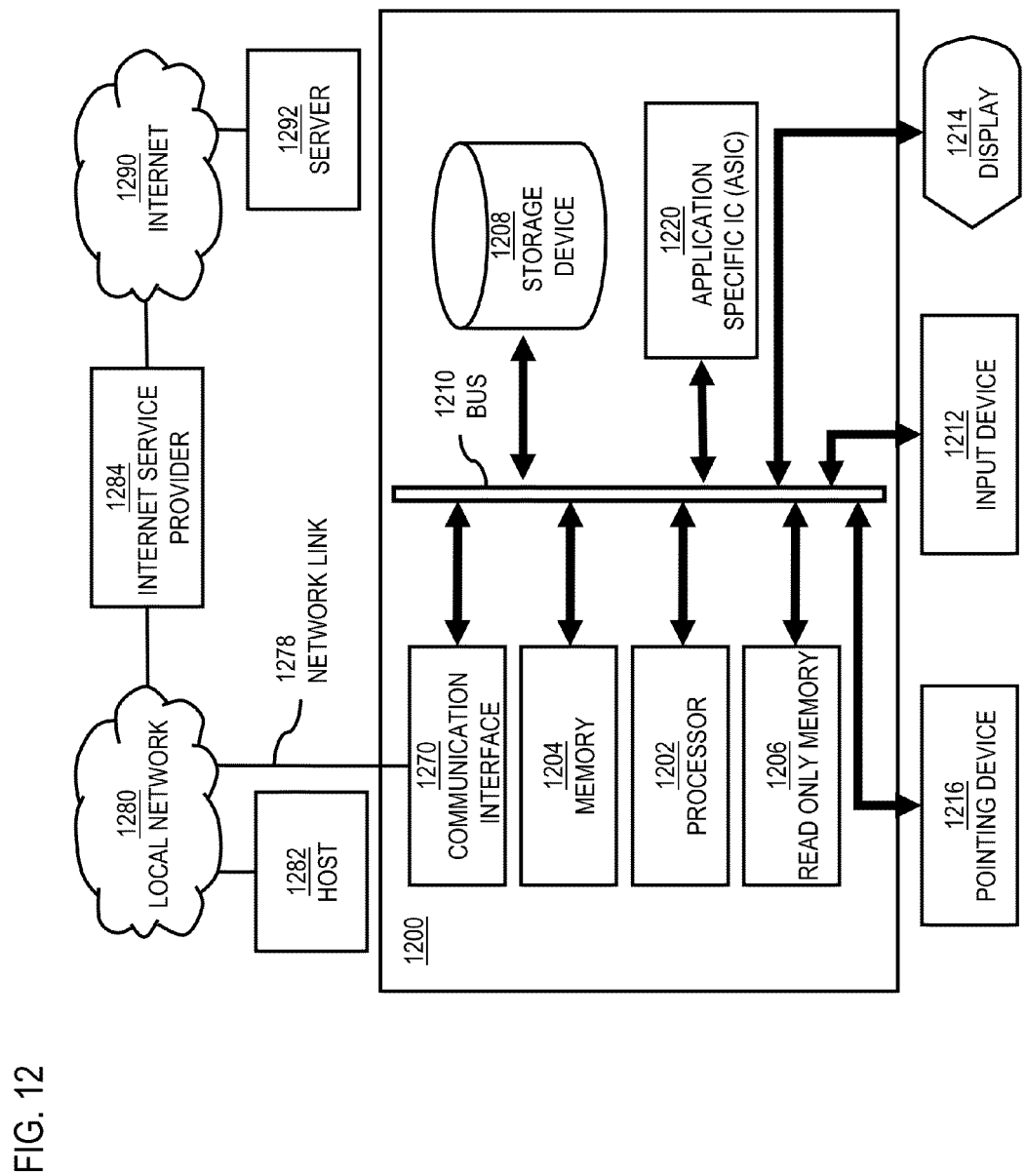
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to apply recipient criteria in identity-based encryption as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of applying recipient criteria in identity-based encryption.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to apply recipient criteria in identity-based encryption. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for applying recipient criteria in identity-based encryption. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for applying recipient criteria in identity-based encryption, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for applying recipient criteria in identity-based encryption.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set 1300 upon which an embodiment of the invention may be implemented. Chip set 1300 is programmed to apply recipient criteria in identity-based encryption as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of applying recipient criteria in identity-based encryption.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to apply recipient criteria in identity-based encryption. The memory 1305 also stores the data associated with or generated by the execution of the inventive steps.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of applying recipient criteria in identity-based encryption. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of applying recipient criteria in identity-based encryption. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to apply recipient criteria in identity-based encryption. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
selecting one or more recipient criteria for data;
encrypting, via a processing device, the data using the selected one or more recipient criteria as a public key of identity-based encryption;
formatting, via the processing device, the selected one or more recipient criteria into a predetermined information representation format or structure;
constructing, via the processing device, a reduced ordered binary decision diagram from the information representation format or structure of the recipient criteria, thereby encrypting the data using the decision diagram of the recipient criteria as the public key; and
causing, at least in part, storage of the decision diagram of the recipient criteria.

2. A method of claim 1, further comprising:
formatting the data into the predetermined information representation format or structure;
constructing another reduced ordered binary decision diagram from the information representation format or structure of the data, thereby encrypting the decision diagram of the data using the decision diagram of the recipient criteria as the public key; and
causing, at least in part, publication of the encrypted decision diagram of the data.

3. A method comprising:
selecting one or more recipient criteria for data;
encrypting, via a processing device, the data using the selected one or more recipient criteria as a public key of identity-based encryption;
formatting, via the processing device, the selected one or more recipient criteria into a predetermined information representation format or structure;
constructing, via the processing device, a reduced ordered binary decision diagram from the information representation format or structure of the recipient criteria;
computing, via the processing device, a hash identifier corresponding to the decision diagram of the recipient criteria, thereby encrypting the data using the decision diagram or hash identifier of the recipient criteria as the public key; and
causing, at least in part, storage of the decision diagram of the recipient criteria and the hash identifier of recipient criteria.

4. A method of claim 3, further comprising:
formatting the data into a predetermined information representation format or structure;
constructing another reduced ordered binary decision diagram from the information representation format or structure of the data;
computing a hash identifier corresponding to the decision diagram of the data, thereby encrypting the decision diagram or hash identifier of the data using the decision diagram or hash identifier of the recipient criteria as the public key; and
causing, at least in part, publication of the encrypted decision diagram or hash identifier of the data.

5. A method of claim 4, further comprising:
encrypting the hash identifier of the recipient criteria with a key thereby providing a keyed hash identifier of the recipient criteria, and
encrypting the hash identifier of the data with a key thereby providing a keyed hash identifier of the data.

6. A method of claim 5, wherein the encrypted decision diagram, hash identifier, or keyed hash identifier of the data is published with the hash identifier or keyed hash identifier of the recipient criteria that is used to encrypt the encrypted decision diagram, hash identifier, or keyed hash identifier of the data.

7. A method of claim 1, wherein the one or more recipient criteria include at least one of a user personality feature, a technical capability of a receiving device, a usage pattern of the device, an environmental condition in which the device is used, and context information associated with the device.

8. An apparatus comprising:
at least one processor; and
at least one memory including computer program code,
wherein the at least one memory and the computer program code configured to, with the at least one processor, cause the apparatus to perform at least the following: select one or more recipient criteria for data,
encrypt the data using the selected one or more recipient criteria as a public key of identity-based encryption,
format the selected one or more recipient criteria into a predetermined information representation format or structure;
construct a reduced ordered binary decision diagram from the information representation format or structure of the recipient criteria, thereby encrypting the data using the decision diagram of the recipient criteria as the public key; and cause, at least in part, storage of the decision diagram of the recipient criteria.

9. An apparatus of claim 8, wherein the apparatus is further caused to:

format the data into the predetermined information representation format or structure, construct another reduced ordered binary decision diagram from the information representation format or structure of the data, thereby encrypting the decision diagram of the data using the decision diagram of the recipient criteria as the public key, and cause, at least in part, publication of the encrypted decision diagram of the data.

10. An apparatus comprising:

at least one processor; and at least one memory including computer program code, wherein the at least one memory and the computer program code configured to, with the at least one processor, cause the apparatus to perform at least the following:

select one or more recipient criteria for data, encrypt the data using the selected one or more recipient criteria as a public key of identity-based encryption, format the selected one or more recipient criteria into a predetermined information representation format or structure;

construct a reduced ordered binary decision diagram from the information representation format or structure of the recipient criteria, compute a hash identifier corresponding to the decision diagram of the recipient criteria, thereby encrypting the data using the decision diagram or hash identifier of the recipient criteria as the public key; and cause, at least in part, storage of the decision diagram of the recipient criteria and the hash identifier of recipient criteria.

11. An apparatus of claim 10, wherein the apparatus is further caused to:

format the data into the predetermined information representation format or structure, construct another reduced ordered binary decision diagram from the information representation format or structure of the data, compute a hash identifier corresponding to the decision diagram of the data, thereby encrypting the decision diagram or hash identifier of the data using the decision diagram or hash identifier of the recipient criteria as the public key, and cause, at least in part, publication of the encrypted decision diagram or hash identifier of the data.

12. An apparatus of claim 11, wherein the apparatus is further caused to:

encrypt the hash identifier of the recipient criteria with a key thereby providing a keyed hash identifier of the recipient criteria, and encrypt the hash identifier of the data with a key thereby providing a keyed hash identifier of the data.

13. An apparatus of claim 12, wherein the encrypted decision diagram, hash identifier, or keyed hash identifier of the data is published with the hash identifier or keyed hash identifier of the recipient criteria that is used to encrypt the encrypted decision diagram, hash identifier, or keyed hash identifier of the data.

14. An apparatus of claim 8, wherein the one or more recipient criteria include at least one of a user personality feature, a technical capability of a receiving device, a usage pattern of the device, an environmental condition in which the device is used, and context information associated with the device.

15. A non-transitory computer-readable storage medium carrying one or more sequences of one or more instructions which, when executed by one or more processors, cause an apparatus to perform at least the following:

selecting one or more recipient criteria for data; and encrypting the data using the selected one or more recipient criteria as a public key of identity-based encryption;

formatting the selected one or more recipient criteria into a predetermined information representation format or structure;

constructing a reduced ordered binary decision diagram from the information representation format or structure of the recipient criteria, thereby encrypting the data using the decision diagram of the recipient criteria as the public key; and causing, at least in part, storage of the decision diagram of the recipient criteria.

16. A non-transitory computer-readable storage medium of claim 15, wherein the apparatus is caused to further perform:

formatting the data into the predetermined information representation format or structure;

constructing another reduced ordered binary decision diagram from the information representation format or structure of the data, thereby encrypting the decision diagram of the data using the decision diagram of the recipient criteria as the public key; and causing, at least in part, publication of the encrypted decision diagram of the data.

17. A non-transitory computer-readable storage medium carrying one or more sequences of one or more instructions which, when executed by one or more processors, cause an apparatus to perform at least the following:

selecting one or more recipient criteria for data;

encrypting the data using the selected one or more recipient criteria as a public key of identity-based encryption;

formatting the selected one or more recipient criteria into a predetermined information representation format or structure;

constructing a reduced ordered binary decision diagram from the information representation format or structure of the recipient criteria;

computing a hash identifier corresponding to the decision diagram of the recipient criteria, thereby encrypting the data using the decision diagram or hash identifier of the recipient criteria as the public key; and causing, at least in part, storage of the decision diagram of the recipient criteria.

* * * * *